(12) United States Patent
Zhu et al.

(10) Patent No.: US 11,569,882 B2
(45) Date of Patent: Jan. 31, 2023

(54) ELECTRONIC DEVICE AND METHOD FOR MULTI-ANTENNA COMMUNICATION APPARATUS

(71) Applicant: Sony Corporation, Tokyo (JP)

(72) Inventors: Xudong Zhu, Beijing (CN); Zhaocheng Wang, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/307,147

(22) PCT Filed: Jun. 1, 2017

(86) PCT No.: PCT/CN2017/086821
§ 371 (c)(1),
(2) Date: Dec. 5, 2018

(87) PCT Pub. No.: WO2017/211217
PCT Pub. Date: Dec. 14, 2017

(65) Prior Publication Data
US 2019/0296812 A1    Sep. 26, 2019

(30) Foreign Application Priority Data
Jun. 8, 2016 (CN) .......................... 201610404821.0

(51) Int. Cl.
*H04B 7/06* (2006.01)
*H04L 5/00* (2006.01)
(Continued)

(52) U.S. Cl.
CPC ............. *H04B 7/06* (2013.01); *H04B 7/0456* (2013.01); *H04B 7/0604* (2013.01); *H04L 5/0044* (2013.01); *H04B 7/0413* (2013.01)

(58) Field of Classification Search
CPC ...... H04B 7/06; H04B 7/0413; H04B 7/0456; H04B 7/04; H04L 5/0044; H04L 7/0604
See application file for complete search history.

(56) References Cited

U.S. PATENT DOCUMENTS 8,830,886 B2 * 9/2014 Ekbatani ................. H04B 7/10
370/310
9,793,965 B1 * 10/2017 Pustovalov .......... H04B 7/0452
(Continued)

FOREIGN PATENT DOCUMENTS

| CN | 101291192 A | 10/2008 |
|----|-------------|---------|
| CN | 101374034 A | 2/2009 |
| CN | 102790637 A | 11/2012 |

OTHER PUBLICATIONS

R. Ramirez-Gutierrez, L. Zhang and J. Elmirghani, "Antenna Beam Pattern Modulation With Lattice-Reduction-Aided Detection," in IEEE Transactions on Vehicular Technology, vol. 65, No. 4, pp. 2007-2015, Apr. 2016. (Year: 2016).*

(Continued)

*Primary Examiner* — Sam K Ahn
*Assistant Examiner* — Amneet Singh
(74) *Attorney, Agent, or Firm* — Xsensus LLP

(57) ABSTRACT

An electronic device for a multi-antenna communication apparatus in a processing circuit. The processing circuit is configured to: map a first information bit to a first reconstructed channel in a plurality of reconstructed channels associated with a plurality of antennas of a multi-antenna communication apparatus; and provide a reconstruction parameter corresponding to the first reconstructed channel, so as to reconstruct an actual channel from the multi-antenna communication apparatus to a peer communication apparatus to bear the first information bit, wherein the plurality of reconstructed channels are determined by configuring, based on a plurality of groups of reconstruction parameters, the (Continued)

plurality of antennas of the multi-antenna communication apparatus, so that the plurality of reconstructed channels have a low correlation with each other.

18 Claims, 16 Drawing Sheets

(51) Int. Cl.
  *H04B 7/0456* (2017.01)
  *H04B 7/0413* (2017.01)

(56) References Cited

U.S. PATENT DOCUMENTS

| | | | |
|---|---|---|---|
| 2009/0080560 A1* | 3/2009 | Na | H04B 7/0617 |
| | | | 375/267 |
| 2011/0007832 A1* | 1/2011 | Yamada | H04B 7/0417 |
| | | | 375/267 |
| 2011/0105032 A1 | 5/2011 | Maruhashi et al. | |
| 2014/0112406 A1* | 4/2014 | Zhu | H04B 7/0626 |
| | | | 375/267 |
| 2016/0127019 A1* | 5/2016 | Schelstraete | H04W 64/003 |
| | | | 370/252 |

OTHER PUBLICATIONS

English-language translation of International Search Report and Written Opinion for International Patent Application No. PCT/CN2017/086821, dated Aug. 18, 2017.

* cited by examiner

ELECTRONIC DEVICE AND METHOD FOR MULTI-ANTENNA COMMUNICATION APPARATUS

CROSS-REFERENCE TO RELATED APPLICATIONS

This application is a National Stage Application based on PCT/CN2017/086821, filed on Jun. 1, 2017, and claims the priority to Chinese Patent Application No. 201610404821.0, tided "ELECTRONIC DEVICE AND METHOD FOR MULTI-ANTENNA COMMUNICATION APPARATUS", filed on Jun. 8, 2016 with the Chinese Patent Office, which is incorporated herein by reference in its entirety.

FIELD

The present disclosure relates to the technical field of wireless communication, and in particular to a spatial modulation (SM) technology applied to a multi-antenna system. More particularly, the present disclosure relates to an electronic apparatus and a method for a multi-antenna communication device, and an electronic apparatus and a method for a communication device. With the electronic apparatus and the method, an actual physical channel is reconstructed, so that the reconstructed channels have low correlation with each other. The information bit is loaded to a number of the reconstructed channel for transmitting, and the information is demodulated by detecting a number of the loaded reconstructed channel, thereby improving the performance of the spatial modulation technology.

BACKGROUND

The multiple-input multiple-output (MIMO) transmission system can provide multiplexing gain, diversity gain and antenna gain. Therefore, the MIMO technology has been applied to many recent communication standards, such as IEEE 802.11n IEEE 802.16 and 3GPP long-term evolution (LTE). However, the MIMO technology results in increase of complexity and hardware consumption. This is mainly due to the following reasons: 1) strong interference between channels; 2) it is difficult to maintain synchronization between antennas; and 3) a high cost of a multi-radio-frequency link.

In order to overcome the disadvantages of the MIMO system while reserve advantages of the MIMO system, a new modulation mode applied to the MIMO system is put forward recently, which is referred to as Spatial Modulation (SM). The spatial modulation can greatly reduce system complexity and hardware consumption in a case of meeting a data rate requirement. The spatial modulation serves as a new modulation technology for the physical layer due to the following two features. First, low complexity and a low cost. In any time slice, only one antenna is activated for data transmission. In this case, interference between channels is avoided without multi-antenna synchronization only one radio frequency link is required, the receiving end is required to receive only one data stream, and thus a simple detection algorithm can be directly used, such as the maximum ratio combing (MRC) detection algorithm. Second, extra modulation order. The basic principle of the spatial modulation is that information on a position of the activated antenna in an antenna array is used for information transmission. This is based on a one-to-one mapping between the antenna numbers and the information bits. Therefore, although only one antenna is activated in each time slice, the spatial modulation can still improve the data transmission rate.

Actually, transmission of the extra information bit provided by the spatial modulation is based on a condition that the receiving end can correctly detect an antenna for transmitting a signal by the transmitting end for each time slice. Therefore, the performance of the spatial modulation severely degrade in a case that the channel vectors of the transmitting antennas have strong correlation.

SUMMARY

The brief summary of the present disclosure is given in the following, so as to provide basic understanding on certain aspects of the present disclosure. It should be understood that, the summary is not exhaustive summary of the present disclosure. The summary is neither intended to determine key or important parts of the present disclosure, nor intended to limit the scope of the present disclosure. An object of the present disclosure is to provide some concepts in a simplified form, as preamble of the detailed description later.

In view of the above problem, an object of at least one embodiment of the present disclosure is to provide a spatial modulation technology applied to a multi-antenna system. In the spatial modulation to an actual physical channel is reconstructed to reduce correlation between reconstructed channels and information transmission and reception is implemented based on the reconstructed channels, so as to solve the problem in the conventional spatial modulation that performance degrades in a case that channel vectors of transmitting antennas have strong correlation.

According to an aspect of the present disclosure, an electronic apparatus for a multi-antenna communication device is provided. The electronic apparatus includes a processing circuit configured to: map a first information bit to a first reconstructed channel among multiple reconstructed channels associated with multiple antennas of the multi-antenna communication device; and provide a reconstruction parameter corresponding to the first reconstructed channel to reconstruct an actual channel from the multi-antenna communication device to a counterpart communication device to carry the first information bit, where the multiple reconstructed channels are determined on the basis that multiple sets of reconstruction parameters configure the multiple antennas of the multi-antenna communication device so that the multiple reconstructed channels have low correlation with each other.

According to a preferred embodiment of the present disclosure the reconstruction parameter includes a parameter related to configuration for at least one of a phase and an amplitude of an antenna.

According to another preferred embodiment of the present disclosure, the processing circuit is further configured to: modulate a second information bit into a first modulation symbol so that the first modulation symbol is transmitted to the counterpart communication device via a reconstructed channel by being included in a radio signal from the multi-antenna communication device.

According to another preferred embodiment of the present disclosure, the processing circuit is further configured to divide a data stream to be transmitted into the first bit and the information bit.

According to another preferred embodiment of the present disclosure, a length of the first information bit is associated with the number of the multiple antennas.

According to another preferred embodiment of the present disclosure, the electronic apparatus further includes a memory configured to store mapping relationship between the first information bit including different bits and respective reconstructed channels, and the processing circuit is further configured to map the first information bit including different bits to different reconstructed channels based on the mapping relationship.

According to another preferred embodiment of the present disclosure, the multiple reconstructed channels are orthogonal to each other.

According to another preferred embodiment of the present disclosure, the multiple of sets of reconstruction parameter corresponding to the multiple reconstructed channels are obtained based on orthogonalization computation performed on a channel matrix corresponding to the actual channel by the processing circuit.

According to another preferred embodiment of the present disclosure, the processing circuit is further configured to feed multiple reconstructed channels back to the counterpart communication device.

According to another preferred embodiment of the present disclosure, the processing circuit is further configured to provide a mapping manner to the counterpart communication device, the mapping manner indicating mapping relationship between the first information bit including different bits and respective reconstructed channels.

According to another preferred embodiment of the present disclosure, the multiple sets of reconstruction parameters corresponding to the multiple reconstructed channels are fed back from the counterpart communication device.

According to another preferred embodiment of the present disclosure the multiple sets of reconstruction parameters corresponding to the multiple reconstructed channels are determined according to a predetermined codebook and a codeword index fed back by the counterpart communication device by the processing circuit.

According to another preferred embodiment of the present disclosure, the processing circuit is further configured to map, according to a mapping manner provided by the counterpart communication device, the first information bit: to the first reconstructed channel, the mapping manner indicating mapping relationship between the first information bit including different bits and respective reconstructed channels.

According to another preferred embodiment of the present disclosure, the multiple sets of reconstruction parameters corresponding to the multiple reconstructed channels are set in advance based on the number of antennas of the multi-antenna communication device.

According to another preferred embodiment of the present disclosure, the electronic apparatus operates as the multi-antenna communication device and further includes: multiple antennas; and a phase shifter and an amplifier respectively connected with each of the antennas, where the processing circuit provides the reconstruction parameters to phase shifters and amplifiers so as to configure phases and amplitudes of the multiple antennas to reconstruct actual channels.

According to another aspect of the present disclosure, an electronic apparatus for a communication device is further provided. The electronic apparatus includes a processing circuit configured to: detect, according to a received signal and multiple reconstructed channels associated with multiple antennas of a counterpart multi-antenna communication device, a number of an activated reconstructed channel, so as to demodulate a first information bit from the counterpart multi-antenna communication device, where the first information bit is mapped to the activated reconstructed channel, the multiple reconstructed channels being determined on the basis that multiple sets of reconstruction parameters configure the multiple antennas of the multi-antenna communication device so that the multiple reconstructed channels have low correlation with each other.

According to another aspect of the present disclosure, a method for a multi-antenna communication device is further provided. The method includes: mapping a fast information bit to a first reconstructed channel among multiple reconstructed channels associated with multiple antennas of the multi-antenna communication device; and providing a reconstruction parameter corresponding to the first reconstructed channel to reconstruct an actual channel from the multi-antenna communication device to a counterpart communication device to carry the first information bit, where the multiple reconstructed channel are determined on the basis that multiple reconstruction parameters configure the multiple antennas of the multi-antenna communication device so that the multiple reconstructed channels have low correlation with each other.

According to another aspect of the present disclosure, a method for a communication device is further provided. The method further includes: detecting, according to a received signal and multiple reconstructed channels associated with multiple antennas of a counterpart multi-antenna communication device, a number of an activated reconstructed channel, so as to demodulate a first information bit from the counterpart multi-antenna communication device, where the first information bit is mapped to the activated reconstructed channel, the multiple reconstructed channels being determined on the basis that multiple sets of reconstruction parameters configure the multiple antennas of the multi-antenna communication device so that the multiple reconstructed channels have low correlation with each other.

According to other aspect of the present disclosure, a computer program code and a computer program product for implementing the method according to the present disclosure, and a computer readable storage medium on which computer program codes for implementing the method according to the present disclosure are recorded, are further provided.

According to the embodiment of the present disclosure, the actual physical channel is reconstructed, so that the reconstructed channels have low correlation with each other. The transmitting end loads information bits on the reconstructed channel for transmission, and the receiving end detects a number of the activated reconstructed channel to demodulate the information thereby reducing the bit error rate for the spatial modulation technology.

Other aspects of the embodiments of the present disclosure are described in the following. The detailed illustration is used to fully disclose preferred embodiments of the present disclosure rather than limit the present disclosure.

BRIEF DESCRIPTION OF THE DRAWINGS

The present disclosure may be understood better with reference to the detailed description given in conjunction with the drawings. Throughout all the drawings, the same or similar reference numerals indicate the same or similar components. The drawings together with the following detailed description are included in the specification and form a part of the specification, so as to illustrate preferred embodiments of the present disclosure by examples and explain principles and advantages of the present disclosure. In the drawings.

DETAILED DESCRIPTION OF THE EMBODIMENTS

An exemplary embodiment of the present disclosure will be described hereinafter in conjunction with the drawings. For conciseness and clarity, not all features of an actual embodiment are described in this specification. However, it should be appreciated that numerous implementation-specific decisions shall be made during developing any of such actual implementations so as to achieve specific targets of the developer, for example, to comply with constraining conditions related to system and business, which may change for different implementations. Furthermore it should also be understood that although the development work may be complicated and time-consuming, for those skilled in the art benefiting from the present disclosure, such development work is only a routine task.

Here, it should further be noted that in order to avoid obscuring the present disclosure due to unnecessary details, only an apparatus structure and/or processing steps closely related to the solution of the present disclosure are illustrated in the accompanying drawing, and other details less related to the present disclosure are omitted.

Figure 1:
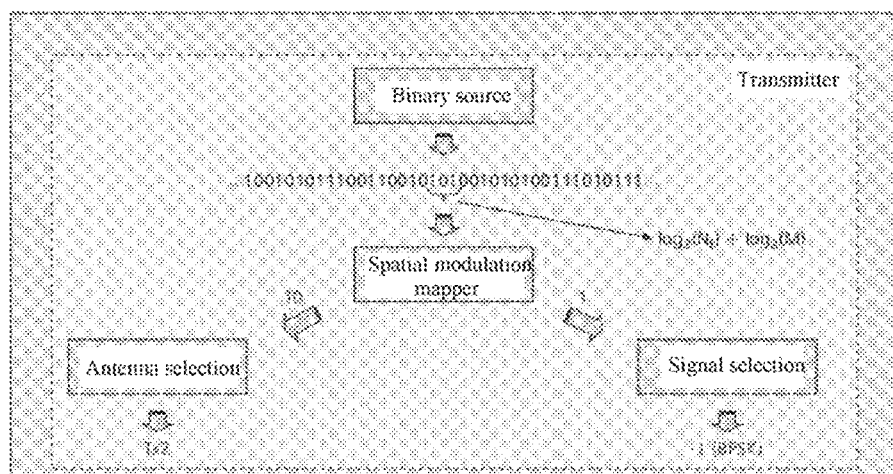
FIG. 1 shows a schematic diagram of a principle of the conventional spatial modulation technology.
Figure 2:
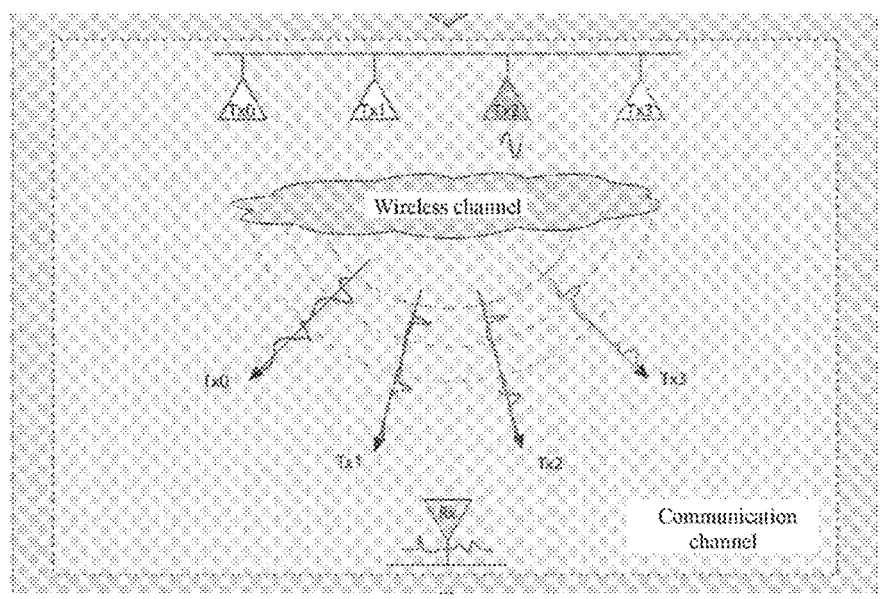
FIG. 2 shows a schematic diagram of signal transmission to which the conventional spatial modulation technology is applied.

Before describing the technology of the present disclosure in detail, basic principles of the conventional spatial modulation technology are described briefly with reference to FIG. 1 and FIG. 2.

The basic idea of the spatial modulation is to map information bits to be transmitted to two types of information; signal constellation (depending on a specific modulation manner) and a number of a transmitting antenna. FIG. 1 shows a schematic diagram of a principle of the conventional spatial modulation technology. As shown in FIG. 1, for a bit stream to be transmitted "101", an information bit "10" is mapped into a number of a transmitting antenna (Tx2, a second antenna), and an information bit "1" is mapped to a modulation symbol "−1" (it is assumed that the modulation anode here is binary phase shift keying (BPSK)). The total data transmission rate R may be represented as: $R=\log_2(N_t)+\log_2(M)$. In which, $N_t$ represents the total number of transmitting antennas, and M represents a modulation order. For example, for BPSK, M is 2, and for quadrature phase shift keying (QPSK), M is 4. It may be seen that, in the spatial modulation, a part of information bits are mapped into selected antennas, a high data transmission speed can be achieved even if only one antenna is activated in one time slice.

A signal transmitted from the transmitting end antenna is transmitted to a receiving end through a wireless channel. Since the transmitting antennas are arranged at different position in an array, signal transmitted from different antennas have different propagation models. In a normal case, only one antenna transmits a signal in each time slice, and a transmission power of other antennas is 0. FIG. 2 shows a schematic diagram of signal transmission to which the conventional spatial modulation technology may be applied. As shown in FIG. 2, in a case that a signal is transmitted through the antenna Tx2, transmission powers of antennas Tx0, Tx1 and Tx3 are 0, and a signal waveform received by the receiving end corresponds to a signal waveform for wireless channel transmission of the antenna Tx2, and thus the receiving end can demodulate the signal based on the received signal and using a corresponding signal detection algorithm (for example, a maximum ratio combing detection algorithm), that is, respectively demodulating information bits mapped to antenna numbers and information bits mapped to modulation symbols.

In essence, the spatial modulation is a channel modulation. Correlation between channels is a key point for determining whether receiving end can correctly detect the number of the transmitting antenna. Therefore, in a case that the wireless channel of the transmitting antenna has strong correlation, the receiving end may not correctly detect the number of the transmitting antenna for transmitting signals in each time slice, resulting in performance deterioration of the spatial modulation. In view of this, an improved spatial modulation technology is provided according to the embodiment of the present disclosure in which, an actual channel is reconstructed to reduce correlation between the reconstructed channels, thereby optimizing the spatial modulation performance. The improved spatial modulation technology according to the embodiment of the present disclosure is described in detail in the following.

Figure 3:
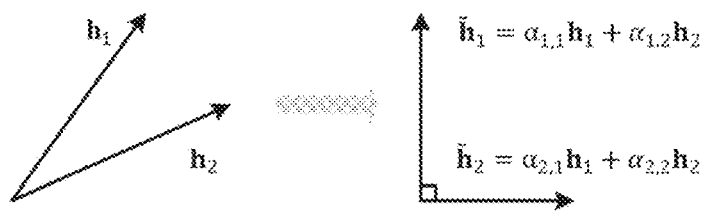
FIG. 3 shows a schematic diagram of a principle of a spatial modulation technology according to the present disclosure.

First, a principle of the spatial modulation technology according to the embodiment of the present disclosure is described with reference to FIG. 3. FIG. 3 shows a schematic diagram of the principle of the spatial modulation technology according to the embodiment of the present disclosure.

As shown in FIG. 3, it is assumed that any two actual physical channels from the transmitting end to the receiving end are respectively indicated by $h_1$ and $h_2$, and channel vectors of the two channels have strong correlation (that is, a phase difference between the two channels is small). In this case, the performance of the conventional spatial modulation technology degrades. According to technology of the present disclosure, the two actual physical channels can be reconstructed by using reconstruction parameters $[\alpha_1, \alpha_2]$, to reduce the correlation between the reconstructed channels (that is, increasing a phase difference between the reconstructed channel vectors). More preferably; the reconstructed channels are orthogonal with each other, that is, $\tilde{h}_1 \perp \tilde{h}_2$. In which, $\tilde{h}_1 = \alpha_1,_1 h_1 + \alpha_1,_2 h_2$, $\tilde{h}_2 = \alpha_2,_1 h1 + \alpha_2,_2 h_2$. In this case, the correlation between the reconstructed channels is minimized. In the following, the spatial modulation technology which causes the reconstructed channels to be orthogonal with each other is also referred to as Orthogonal Spatial Modulation (OSM).

It may be seen that, each reconstructed channel may be indicated as a combination of all actual physical channels. Channels are reconstructed by using appropriate reconstruction parameters, so that only one reconstructed channel is activated in each time slice, and thus the receiving end can detect the received steal by detecting a number of the activated reconstructed channel. This is similar to the conventional spatial modulation in that only one transmitting antenna is activated in each time slice in the conventional spatial modulation. However, in the spatial modulation according to the present disclosure, all transmitting antennas are activated in each time slice, and each transmitting antenna can be configured based on the corresponding reconstruction parameter to achieve channel reconstruction.

Figure 4A:
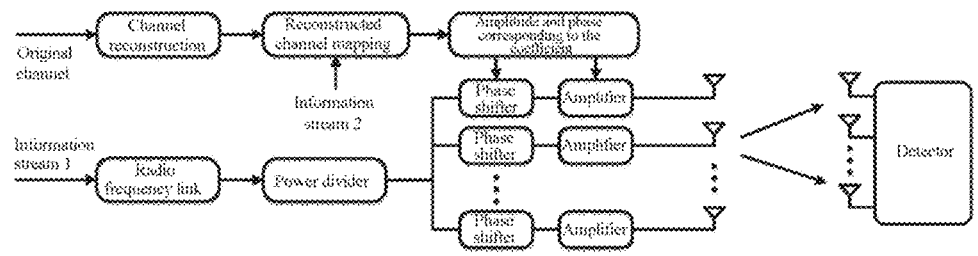
FIG. 4A shows a block diagram of a configuration example of a spatial modulation transceiving system to which the technology of the present disclosure is applied.

The present disclosure is provided based on such idea. Hereinafter, a complete operation process of the spatial modulation technology according to the present disclosure is described in detail in conjunction with the configuration example of the spatial modulation transceiving system to which the technology of the present disclosure is applied as shown in FIG. 4A.

It is assumed that the actual channel matrix obtained by channel estimation by using the pilot transmission technology is $H=[h_1 \ h_2 \ \ldots \ h_{N_t}] \in \mathbb{C}^{N_r \times N_t}$, $h_i \in \mathbb{C}^{N_r \times 1}$ (in which, the transmitting end has $N_t$ antennas, $N_t \geq 2$; the receiving end has $N_r$ antennas, $N_r \geq 1$), the reconstructed channel matrix may be represented as $\tilde{H}=[\tilde{h}_1 \tilde{h}_2 \ \ldots \ \tilde{h}_{N_t}]=HA \in \mathbb{C}^{N_r \times N_t}$. In which, $A=[\alpha_1 \alpha_2 \ \ldots \ \alpha_{N_t}] \in \mathbb{C}^{N_t \times N_t}$ ($\alpha_1 \in \mathbb{C}^{N_t \times 1}$), represents the reconstruction parameter matrix, so that any two reconstructed channel vectors have low correlation with each other. Preferably, any two reconstructed channel vectors are orthrogorthogonal to each other, that is, $\tilde{h}_i \perp \tilde{h}_j$, $\forall i \neq j$. In the following, how to calculate the construction parameters so that the constructed channels are orthogonal to each other is described in detail by examples.

Specifically, the constructed channel vector $\tilde{h}_j (1 \leq j \leq N_t)$ is a combination of all actual channel vectors ($h_i$, $1 \leq i \leq N_t$). Therefore, a transmitting power requirement is to be met, that is, $$\tilde{h}_j = \sum_{i=1}^{N_t} \alpha_{j,i} h_i = H\alpha_j, \sum_{i=1}^{N_t} \alpha_{j,i}^2 = \|\alpha_j\|_F^2 = 1, \alpha_j = [\alpha_{j,1} \alpha_{j,2} \ \ldots \ \alpha_{j,N_t}]^T$$

In a case that the reconstructed channels are orthogonal to each other, the reconstructed channel vector after orthogonalizatio may be calculated by using the conventional Gram-Schmidt orthogonalization algorithm.

$$\begin{cases} \tilde{h}_1 = h_1 \\ \tilde{h}_j = \frac{1}{\sqrt{\lambda_j}} \left( h_j - \sum_{i=1}^{j-1} \frac{h_j^H \tilde{h}_i}{\tilde{h}_i^H \tilde{h}_i} \tilde{h}_i \right), 2 \leq j \leq N_t, \end{cases}$$

In which, $\sqrt{\lambda_j}$ represents a power normalization factor for the reconstructed channel. It can be seen from the above equation that, the reconstructed channel vectors are orthogonal to each other, that is, $\tilde{h}_i \perp \tilde{h}_j$, $\forall i \neq j$. According to the above equation, the acquired coefficient vector $\alpha_j$ may be expressed by:

$$\begin{cases} \alpha_1 = [1 \ 0 \ \ldots \ 0] \\ \alpha_2 = \left[ 0 \ \frac{1}{\sqrt{\lambda_2}} \ 0 \ \ldots \ 0 \right] - \frac{h_2^H \tilde{h}_1}{\sqrt{\lambda_2} \tilde{h}_1^H \tilde{h}_1} \alpha_1 \\ \vdots \\ \alpha_j = \left[ 0 \ \ldots \ \frac{1}{\sqrt{\lambda_j}} \ \ldots \ 0 \right] - \sum_{i=1}^{j-1} \frac{h_j^H \tilde{h}_i}{\sqrt{\lambda_j} \tilde{h}_i^H \tilde{h}_i} \alpha_i \\ \vdots \end{cases}$$

In which, an expression of the coefficient $\lambda_j$ may be obtained based on the power constraint condition $\|\alpha_j\|_2^2 = 1$, that is, $$\lambda_j = \left\| [0 \ \ldots \ 1 \ \ldots \ 0] - \sum_{i=1}^{j-1} \frac{h_j^H \tilde{h}_i}{\tilde{h}_i^H \tilde{h}_i} \alpha_i \right\|_2^2, 2 \leq j \leq N_t.$$

Through mutual iteration between the coefficient $\alpha_j$ and the coefficient $\lambda_j$, the final coefficient matrix A and the reconstructed channel matrix after orthogonalization may be obtained as follows: $\tilde{H}=[\tilde{h}_1 \tilde{h}_2 \ \ldots \ \tilde{h}_{N_t}]=H[\alpha_1 \alpha_2 \ \ldots \ \alpha_{N_t}]$.

It should be noted that, the Gram-Schmidt orthogonalization algorithm here is a schematic calculation method for channel matrix orthogonalization, and those skilled in the art may calculate the reconstructed channel by using other orthogonalization algorithm well-known in the art. For example, SVD decomposition (singular value decomposition, a classic matrix decomposition algorithm) may be performed on the channel matrix H. That is, $H=U\Sigma V^*$, in which $U \in \mathbb{C}^{N_r \times N_r}$ represents a unitary matrix (unit orthogonal basis), $\Sigma \in \mathbb{C}^{N_r \times N_t}$ represents a partial diagonal matrix, $V \in \mathbb{C}^{N_r \times N_t}$ also represents a unitary matrix. Taking U as the reconstructed channel vector, the corresponding reconstruction parameter may be expressed by $U=HV\Sigma^{-1}$, $u_j=\Sigma_{i=1}^{Nt}\beta_{j,i}h_i$. Similar to the result of the above Gram-Schmidt orthogonalization algorithm, a reconstruction parameter matrix B may be generate, and elements of B are indicated by $\beta_{j,i}$. The specific calculation process may be achieved by mathematic knowledge well-known for those skilled in the art, which is not described in detail here.

It should be further noted that, the reconstruction parameter matrix is not unique, and the parameter matrix with the same function and the orthogonalized reconstructed channel may be acquired by mathematic transformation. For example, uniform phase rotation on the reconstruction parameter matrix does not change the orthogonal performance, and the orthogonal basis of the same channel matrix may be expressed in infinite manners (classic algebraic knowledge).

In addition, it should be noted that the specific reconstruction algorithm is described in detail in a case that the reconstructed channels are orthogonal to each other. It should be understood that, in a case that the reconstructed channels are non-orthogonal available reconstruction parameters may be calculated by using the known mathematic knowledge by those skilled in the art based on a specific application scene, performance requirement and implementation cost (for example, a calculation load and a hardware cost), to reduce the correlation between actual channels.

It should be understood that the reconstruction parameters may be calculated by the transmitting end or the receiving end, and a party performing calculation is required to feed back the calculated reconstruction parameter or reconstructed channel to another party for signal transmitting and demodulating.

As another alternative implementation, the reconstruction parameter may not be calculated based on the real time channel information, but is set in advance. With the reconstruction parameter, the transmitting signal may be transmitted at different direction angles in a physical space, which is beneficial for different reconstructed channels to transmit signal in different propagating paths in the physical space. This manner is similar to beamforming. However, in this manner, the reconstruction parameter is not calculated based on the real time channel information, therefore it cannot be ensured that the correlation between the reconstructed channels is minimized, resulting in performance deterioration to a certain degree. In another aspect, this manner is beneficial to a multi-user scene. Specifically, multiple users at close positions may use the same reconstruction parameter, thereby greatly reducing extra overhead for calculating and feeding back the reconstruction parameter. That is, according to specific application scenes, those skilled in the art may calculate the reconstruction parameter based on a real time channel condition or may select a preset reconstruction parameter, which is not limited in the present disclosure, as long as the correlation between the reconstructed channels can be reduced, such that the receiving end can successfully detect a number of the activated reconstructed channel.

After obtaining the reconstruction parameter and the reconstructed channel, the transmitting end transmits a signal in the following manner. An information bit to be transmitted is mapped to a corresponding reconstructed channel, and an actual channel is reconstructed based on the reconstruction parameter corresponding to the reconstructed channel, to carry the information bit to be transmitted Reference is made to FIG. 4A which is a block diagram of a configuration example of a spatial modulation transceiving system to which the present disclosure may be applied. It is assumed that an information stream 2 is mapped to a reconstructed channel $\tilde{h}_j$, and a transmitting end antenna is configured by using the reconstruction parameter $\alpha_j$ corresponding to the reconstructed channel $\tilde{h}_j$. Specifically, the reconstruction parameter $\alpha_j$ may be decomposed into an amplitude and a phase, that is, $\alpha_j=|\alpha_j|e^{j\phi_j}$. Then, the amplitude and the phase are loaded to an amplifier ($|\alpha_j|$) and a phase shifter ($\phi_j$) corresponding to each antenna, to achieve channel reconstruction. Practically, the channel reconstruction may be implemented by logic devices other than the amplifier and the phase shifter, as long as the amplitude and the phase of the antenna can be configured. It should be understood that a length of the information bit mapped to the reconstructed channel and to be transmitted is related to the number of transmitting antennas. For example, if there are four transmitting antennas, the information bit which can be transmitted is 2 bits. If there are eight antennas, the information bit which can be transmitted is 3 bits. That is, the length of the information bit which can be transmitted may be expressed as $\log_2(N_r)$. Therefore, it should be understood that the technical solution according to the present disclosure is particularly adaptable to a mmWave communication scene deployed with a large number of antennas. The application according to the present disclosure is not limited to the above scene, and the applied frequency band is not limited.

In addition, the transmitting end maps the information bit in the information stream 1 to be transmitted to a data symbol $s_m \in \mathcal{S}$, the data symbol becomes into a radio frequency signal through a radio frequency link, and a final transmitting signal for the i-th antenna may be expressed by $\alpha_{j,1}s_m$, after the radio frequency signal passes through the phase shifter and the amplifier configured based on the reconstruction parameter $\alpha_j$. The above modulation process may be regarded as signal mapping on a constellation point set $X=\{x_{j,m} \in \mathbb{C}^{N_t \times 1}: 1 \leq j \leq N_r, 1 \leq m \leq M\}$, $|X|=MN_r$. In which, $x_{j,m}=[\alpha_{j,1}s_m \alpha_{j,2}s_m \ldots \alpha_{j,N_t}s_m]^T$ indicates a transmission signal vector for the $N_r$-th antenna, and $s_m \in \mathcal{S}$ indicates an amplitude phase modulation symbol. Therefore, the spatial modulation is equivalent to optimization to spatial constellation points in essence. In addition, in the spatial modulation technology according to the present disclosure, all antennas are activated to transmit signals. Therefore, a power divider shown in FIG. 4A is configured to divide one path of signal in the radio frequency link into multi-path signals in average so as to be loaded onto each transmitting antenna. It follows that, as compared with the conventional spatial modulation technology that only one antenna is configured to transmit a signal in each time slice, with the spatial modulation technology according to the present disclosure, the signal is distributed for all transmitting antennas in average, and the channel reconstruction is achieved by the phase shifter and the amplifier connected to each antenna, so that only one reconstructed channel is available (that is, being activated) in each time slice, and thus the receiving end can demodulate the information bit corresponding to the reconstructed channel by detecting the available reconstructed channel.

It should be noted that, the information stream to be transmitted shown in FIG. 4A is divided into the information stream 1 and the information stream 2, the information stream 2 is mapped to a corresponding reconstructed channel, and the information stream 1 is modulated into a corresponding modulation symbol and is transmitted to the receiving end via the reconstructed channel. However, in some applications, the information stream 1 may be a bit signal of all 1, all 0 or any bit signal rather than modulated data, and the information stream 2 is transmitted (for example, transmitting a little and important information, such as a security key based on the present disclosure. In other words, it is unnecessary to divide the data bit to be transmitted into two parts and select one of the two parts to be mapped to the reconstructed channel.

Figure 4B:
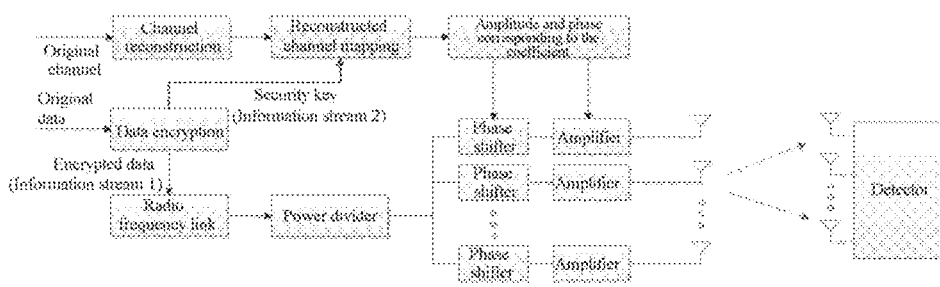
FIG. 4B is a block diagram of another configuration example of the spatial modulation transceiving system to which the technology of the present disclosure is applied.

In another example, the transmitting end expects to transmit voice or application data to the receiving end. In order to enhance security, the voice or application data is encrypted by using the security key. The encrypted voice or application data to be transmitted functions as the information stream 1, and the security key for encrypting the voice or application data functions as the information stream 2. The bit corresponding to the security key is mapped onto the corresponding reconstructed channel for transmission based on the spatial modulation solution according to the present disclosure. FIG. 4B shows an implementation of such application example, and FIG. 4B is a block diagram of another configuration example of the spatial modulation transceiving system to which the technology of the present disclosure is applied. As shown in FIG. 4B, in such example, the transmitting end may further include a data encryption module connected to the reconstructed channel mapping module. The data encryption module encrypts original data by using the security key. The encrypted data functioning as the information stream 1 shown in FIG. 4A is modulated into the corresponding modulation symbol and is transmitted to the receiving end through the reconstructed channel, and the security key functioning as the information stream 2 shown in FIG. 4A is mapped to the corresponding reconstructed channel. In such example, only the receiving end at the specific location (which can distinguish the reconstructed channels) can demodulate to obtain the security key and decrypt the data by using the security key, so that the communication security can be ensured to a certain degree.

The signal received by the receiving end may be indicated as $y=\sqrt{\rho}Hx_{j,m}+n=\sqrt{\rho}h_j s_m+n$. In which, $\sqrt{\rho}$ indicates a receiving signal-to-noise ratio of each antenna of the receiving end and n indicates a noise signal obeying Gaussian distribution of cn (0, 1). Then, the receiving end may detect a number j of the activated reconstructed channel and an amplitude phase modulation symbol $S_m$ based on the received signal y and the reconstructed channel matrix $\tilde{H}$, thereby recovering the information stream 2 and the information stream 1 respectively. Specifically, as an example, the receiving end may detect the signal by using the maximum ratio combing detection algorithm.

Figure 5:
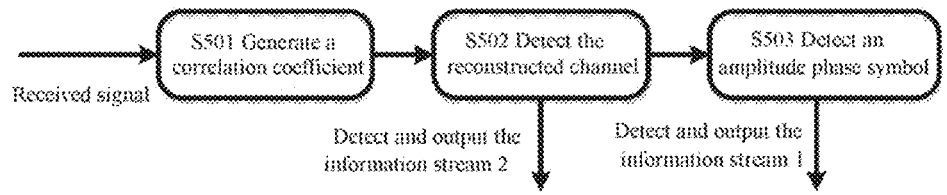
FIG. 5 shows a schematic diagram of an example of a receiving end signal detection process.

Hereinafter the process of a schematic method of detecting a signal by the receiving end is described with reference to FIG. 5. FIG. 5 is a schematic diagram showing an example of a signal detection process of the receiving end.

As shown in FIG. 5, first in step S501, a correlation coefficient is generated. Specifically, the receiving signal vector $y \in \mathbb{C}^{N_r \times 1}$ and the reconstructed channel vector are multiplied and a product is normalized to obtain the correlation coefficient:

$$\tilde{g}_j = \frac{\tilde{h}_j^H y}{\sqrt{\rho}\|\tilde{h}_j\|_2^2}, 1 \leq j \leq N_t.$$

Then, in step S502, the reconstructed channel is detected. Specifically, the correlation coefficient is maximized to detect a number of the activated reconstructed channel, that is, $j=\arg \max_j |\tilde{g}_j|$. It should understood that, based on the defined correlation coefficient, as the correlation between the reconstructed channels decreases, the receiving end can detect the activated reconstructed channel easier, and the bit error rate becomes lower. Therefore, in an ideal case, it is expected that the reconstructed channels are orthogonal to each other.

Then, the inputted information stream 2 can be demodulated based on mapping relationship between the number of the reconstructed channel and the information bit. It should be noted that the mapping relationship may be predetermined, and thus may be pre-stored in memories of the transmitting end and the receiving end. In addition, it should be further noted that, the mapping relationship between the number of the reconstructed channel and the information bit may be dynamic, the transmitting end and the receiving end may achieve consistency by signaling interaction, and the transmitting end or the receiving end may dynamically change the mapping relationship based on the real time channel condition Specifically, in the conventional modulation technology, there is an optimal mapping mode, and mapping is performed based on a fixed matching mode. In the spatial modulation according to the present disclosure, the channel changes, and the channel reconstructed each time also changes. Therefore, in a case that the mapping mode changes, a corresponding mapping mode should be carried in feeding back the reconstruction parameter configuration information. Alternatively, the mapping relationship may be quasi-static. That is, a static mapping configuration may be preset. A party performing channel reconstruction calculation decides to whether to start the dynamic mapping function during the communication process, and feeds back the determined mapping relationship to the communication counterpart in a case of starting the dynamic mapping. In a schematic manner, the mapping mode is changed in a case that the similar information bats are separated as much as possible. In another schematic manner, the number of antennas of the transmitting end for transmitting signals to certain receiving ends is variable, and thus the mapping relationship between a number of the reconstructed channel and the information bit changes accordingly.

Subsequently, in step S503, the amplitude phase modulation symbol such as BPSK and QPSK is detected. Specifically, based on the reconstructed channel detection result in step S502, a number of the amplitude phase modulation symbol is detected by minimizing the Euclidean distance, that is, $\hat{m}=\arg \min_m |s_m - \tilde{g}_j|$, thereby demodulating the inputted information stream 1.

It should be understood that, in addition to the signal detection algorithm described with reference to FIG. 5, those skilled in the art may detect the receiving signal according to other spatial modulation detection algorithm well known in the art in a case that the original channel is replaced by the reconstructed channel, which is not described in detail here.

In order to further facilitate understanding the spatial modulation technology according to the present disclosure, a signaling interaction process between the transmitting end and the receiving end under different scenes is described in detail in conjunction with FIG. 6A to FIG. 6D hereinafter.

Figure 6A:
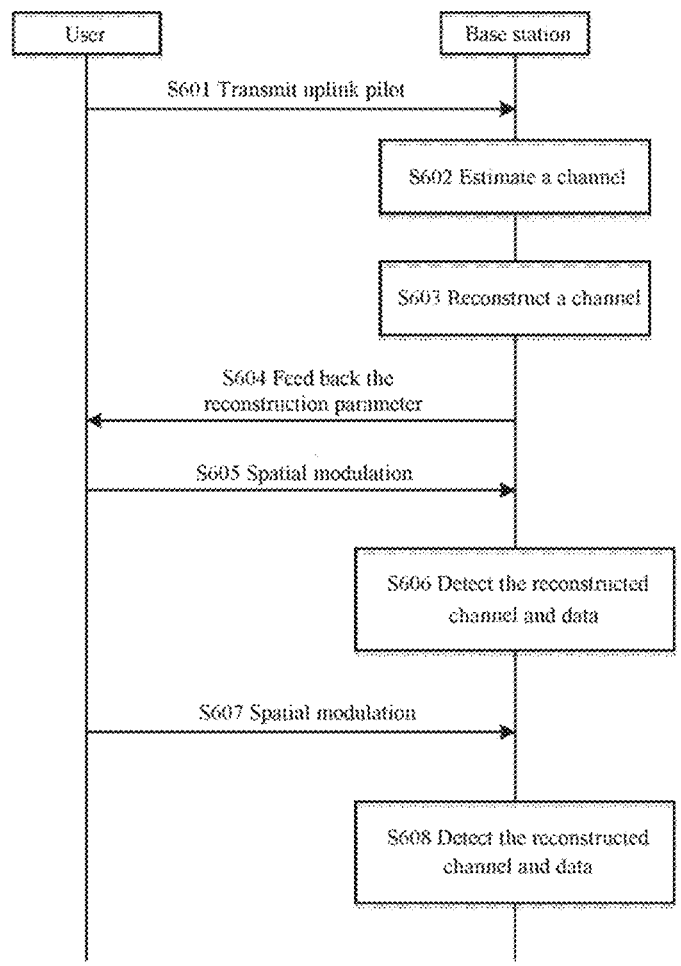
FIG. 6A to FIG. 6D respectively show flowcharts of a signaling interaction process under a first schematic scene to a fourth schematic scene according to an embodiment of the present disclosure.

FIG. 6A is a flowchart of an example of a signaling interaction process under a first schematic scene according to an embodiment of the present disclosure.

The application scene shown in FIG. 6A is uplink pilot and uplink transmission. That is, a user equipment performs uplink transmission to the base station, and the user equipment transmits an uplink pilot signal, so that the base station estimates and reconstructs the channel.

As shown in FIG. 6A, first, in step S601, the user equipment transmits an uplink pilot signal such as a sounding reference signal (SRS) to the base station.

Then, in step S602, the base station estimates the channel based on the received uplink pilot signal to obtain the above channel matrix H.

Subsequently, in step S603, the base station reconstructs the channel matrix H, so that the reconstructed channels have low correlation with each other. Specifically, the base station reconstructs the channel matrix by using the above orthogonalization algorithm. For the specific calculation process, one may refer to the above description, which is not repeated here.

Then, in step S604, the base station feeds back the reconstruction parameter configuration information to the user equipment. Specifically, the base station may directly feed back a calculated reconstruction parameter set corresponding to the multiple reconstructed channels with low correlation to the user equipment.

Practically, in a case that there are a large number of antennas and the channel condition changes frequently, direct feedback of the calculated reconstruction parameter matrix each time may result in great signaling overhead. Therefore, in an alternative example, in order to reduce the overhead, the reconstruction parameter matrix corresponding to multiple reconstructed channels with low correlation may be fed back to the user equipment by feeding back codeword indexes corresponding to the reconstruction parameter matrix during a period (depending on a specific reconstruction period).

Figure 7:
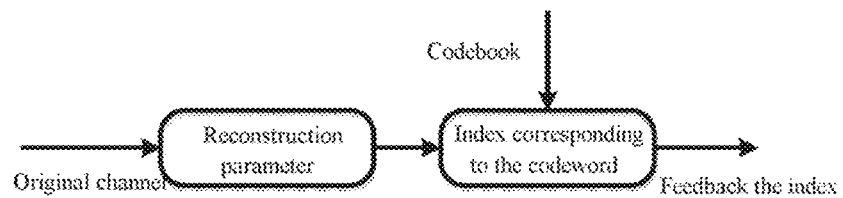
FIG. 7 is a schematic diagram of feeding back channel reconstruction parameters by feeding back codeword indexes.

A codebook $\Omega=\{B_1, B_2, \ldots B_L\}$ for the reconstruction parameter matrix is preset, in which $B_i=\{\beta_1, \beta_2 \ldots \beta_{Nt}\}$. The base station searches for the closest codeword in the codebook according to the calculated reconstruction parameter matrix, and determines its index $\hat{i}$. Therefore, different from the manner of directly feeding back the reconstruction parameter matrix, only the index $\hat{i}$ corresponding to the codeword is fed back here. FIG. 7 shows a schematic implementation of such feedback manner. Accordingly, the user equipment may extract corresponding reconstruction parameters to perform channel reconstruction and data transmission based on the preset codebook and the index fed back. In an example, the user equipment reads a codeword B corresponding to the index $\hat{i}$ from the stored codebook consistent with the base station, selects one of multiple reconstruction parameters (such as $\beta_1$ to $\beta_{Nt}$) indicated by the codeword to weight the original channel, based on the information stream 2 to be transmitted currently and a correspondence between bit sequences of the information stream 2 and numbers of the reconstructed channels, that is, adjusting an amplitude and a phase of the transmitting antenna, so as to transmit a signal on which spatial modulation according to the present disclosure is performed to the base station. In another aspect, the base station weights the previously estimated original channel by using the multiple reconstruction parameters (such as $\beta_1$ to $\beta_{Nt}$) one by one, to regenerate the reconstructed channel, and thus calculates a correlation coefficient between the reconstructed channel and the received signal for each uplink data transmission, and determines the activated reconstructed channel. Through the above manner, the bit sequence in the second information stream for each data transmission is obtained. In another example, the user equipment inserts a demodulation reference signal such as DMRS in the LTE protocol in the uplink data signal, and transmits the data signal together with DMRS to the base station via an adjusted antenna. The base station may obtain an actually reconstructed uplink data channel by estimating based on DMRS, and calculates a correlation coefficient between the estimated reconstructed channel and each of the multiple reconstruction parameters (such as $\beta_1$ to $\beta_{Nt}$), and determines the activated reconstructed channel which provides another method for detecting the activated reconstructed channel.

In an embodiment based on an LTE communication system or its evolution, the base station contains the reconstruction parameter in dedicated high layer signaling such as radio resource control messages. In addition, in a scene in which the channel condition changes frequently, the reconstruction parameter may be contained in MAC layer or physical layer signaling by codeword index informing.

As described above, in a case that the mapping relationship between the information bit and the reconstructed channel number is not predetermined, a party performing channel estimating and reconstruction is required to determine the mapping relationship between the information bit and the reconstructed channel based on the real time channel condition, and notifies a communication counterpart of the mapping relationship. That is, in the embodiment, in step S604, the base station is further required to feed back the mapping relationship together with the reconstruction parameter to the user equipment. Preferably, the reconstruction parameter and/or the mapping relationship may be carried by broadcast signaling, which is particularly adaptable to a multi-user scene.

Subsequently, in step S605, based on the reconstruction parameter configuration information fed back, the user equipment performs spatial modulation on a first information bit to be transmitted according to the spatial modulation technology of the present disclosure described with reference to FIG. 4A, so as to transmit the modulated first information bit to the base station. That is, a first reconstructed channel corresponding to the first information bit to be transmitted is activated, antennas of the user equipment are configured based on the reconstruction parameters corresponding to the activated first reconstructed channel, so as to transmit a corresponding amplitude phase modulation symbol.

Then, in step S606, the base station respectively detects the activated first reconstructed channel and the corresponding amplitude phase modulation symbol based on the above received signal detection method, to demodulate the received data.

Subsequently, in next transmission, in step S607, the user equipment performs spatial modulation on a second information bit to be transmitted based on the reconstruction parameter configuration information fed back in step S604 and the spatial modulation technology above, so as to transmit the modulated second information bit to the base station, that is, a second reconstructed channel corresponding to the second information bit to be transmitted is activated, and antennas of the user equipment are configured based on the reconstruction parameter corresponding to the activated second reconstructed channel, so as to transmit a corresponding amplitude phase modulation symbol. Then, in step S608, the base station respectively detects the activated second reconstructed channel and the corresponding amplitude phase modulation symbol by using the above received signal detection method, to demodulate the received data.

It should be understood that, the protocol for the reconstruction parameter configuration information and the mapping relationship between the reconstructed channel and the information bit which is negotiated between the transmitting end and the receiving end in step S604, may be long-term configurations, unless the protocol changes due to change of the channel condition. Otherwise, in a subsequent communication process, the transmitting end and the receiving end select to active different reconstructed channels for operation in response to different transmission bit sequences, according to the protocol negotiated in step S604.

In addition, it can be seen from the signaling interaction process shown in FIG. 6A, in order to successfully demodulate the received data, both the transmitting end and the receiving end should know the reconstructed channel information and the corresponding mapping relationship, and an actual channel between the transmitting end and the receiving end should be substantially consistent with the expected channel. Therefore, the signal is transmitted by mapping the information bit to be transmitted to the corresponding reconstructed channel, thereby improving security of the data transmission. Therefore, the present disclosure may be applied to security data transmission. For example, some important information bits (such as key) are carried in the information stream 2 to be loaded to the reconstructed channel number, so that the receiving party can decode the key only in a case of obtaining the reconstructed channel matrix and the mapping relationship, thereby transmitting the key safely.

Figure 6B:
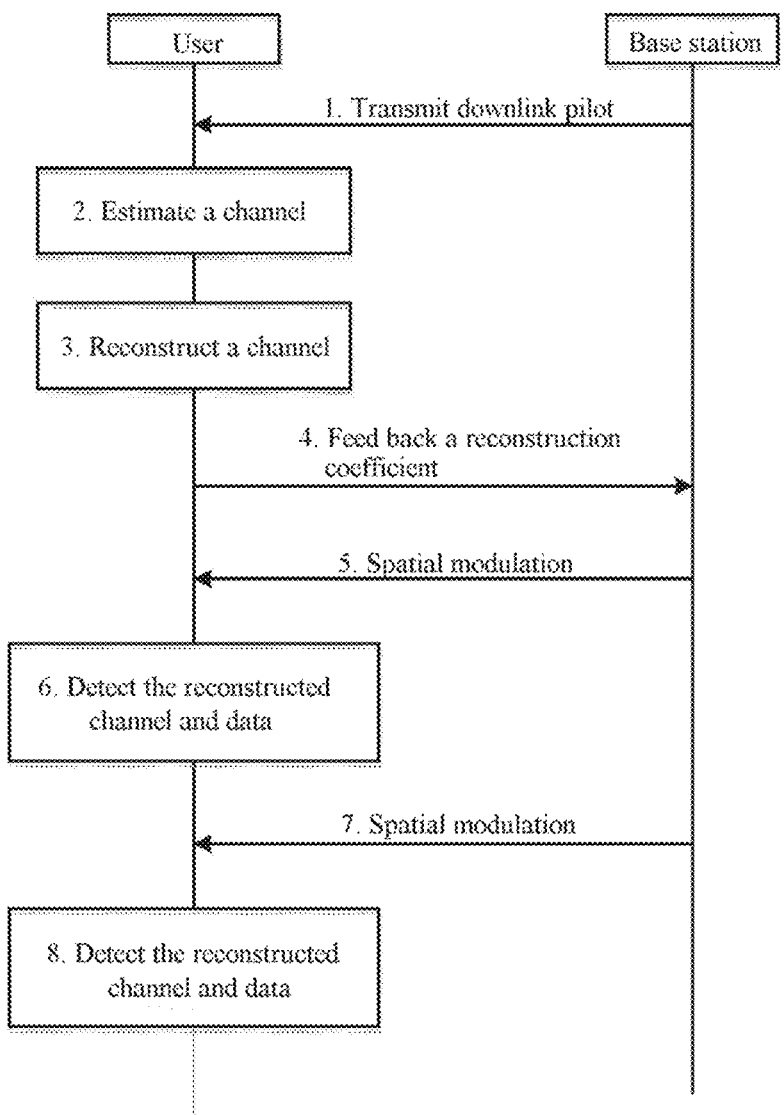

FIG. 6B is a flowchart of an example of a signaling interaction process in a second schematic scene according to an embodiment of the present disclosure.

The application scene shown in FIG. 6B is downlink pilot and downlink transmission. That is, the base station performs downlink transmission to the user equipment, and the base station transmits a downlink pilot signal so that the user equipment estimates and reconstructs the channel.

The signaling interaction process shown in FIG. 6B is substantially the same as that shown in FIG. 6A. The difference only lies in that a body performing corresponding operations in FIG. 6B differs from that in FIG. 6A. Therefore, details are not repeated here. Examples of the downlink pilot signal may include a cell-specific reference signal (CRS), a channel state indicator-reference signal (CSI-RS) and so on.

Figure 6C:
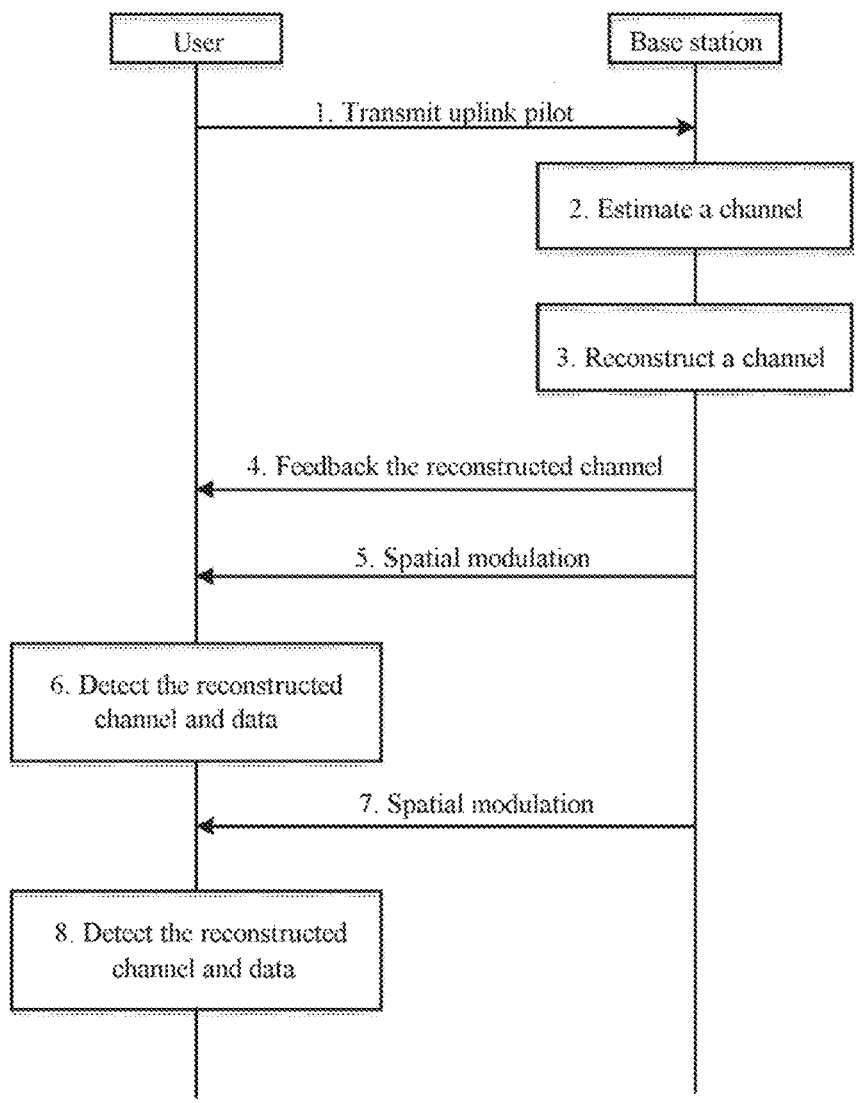

FIG. 6C is a flowchart of a signaling interaction process under a third schematic scene according to an embodiment of the present disclosure.

The application scene shown in FIG. 6C is uplink pilot and downlink transmission. That is, the base station performs downlink transmission to the user equipment, and the user equipment transmits an uplink pilot signal, so that the base station estimates and reconstructs the channel.

The signaling interaction process shown in FIG. 6C is substantially the same as that shown in FIG. 6A. The difference only lies in that: the base station is required to feed back the reconstructed channel rather than the reconstruction parameter to the user equipment after performing the channel estimation and the channel reconstruction. The channel estimation is performed by the base station, thus the user equipment does not known the actual physical channel, and cannot detect the signal by directly using the reconstruction parameter and the actual channel. That is, in a case that the channel estimation and reconstruction is performed by the transmitting end, the transmitting end is required to transmit the reconstructed channel to the receiving end, so that the receiving end detects the signal.

Figure 6D:
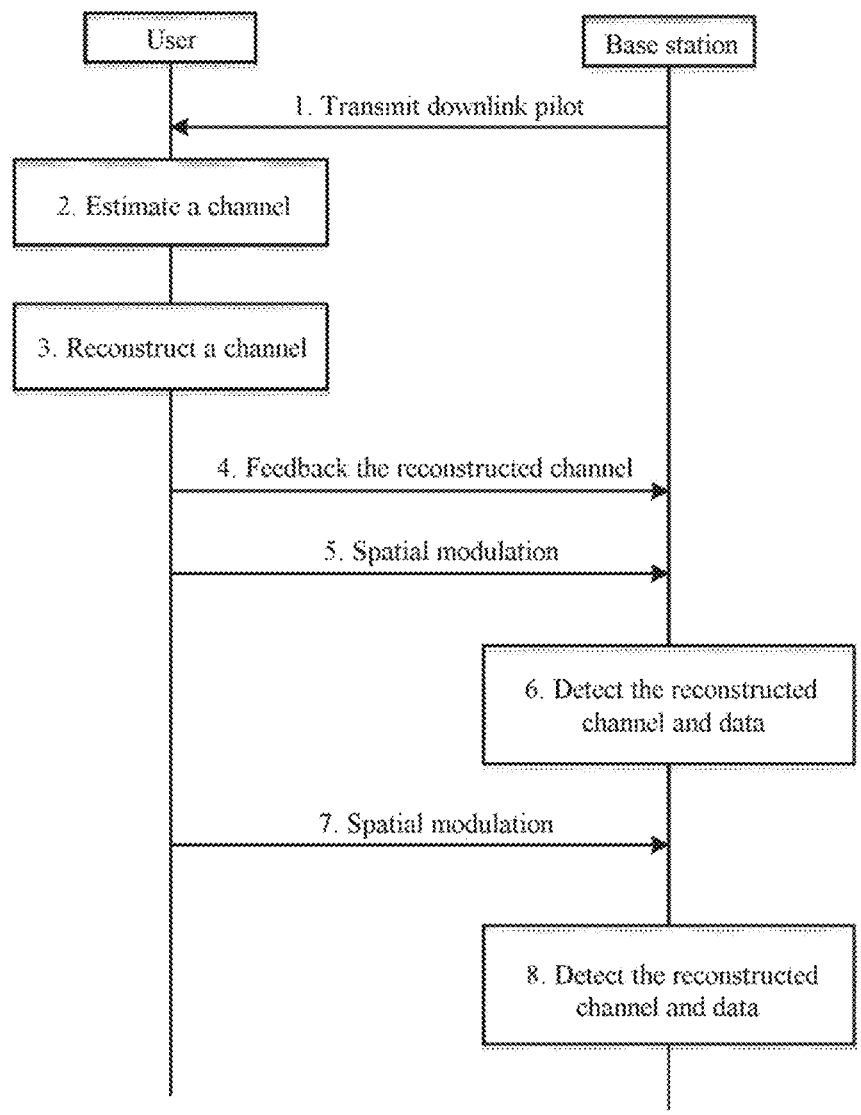

FIG. 6D is a flowchart of a signaling interaction process under a fourth schematic scene according to an embodiment of the present disclosure.

The application scene shown in FIG. 6D is downlink pilot and uplink transmission. That is, the user equipment performs uplink transmission to the base station, and the base station transmits the downlink pilot signal, so that the user equipment estimates and reconstructs the channel.

The signaling interaction process shown in FIG. 6D is substantially the same as that shown in FIG. 6C. The difference only lies in that: a body performing the corresponding operations in FIG. 6D differs from that in FIG. 6C. Therefore details are not repeated here. Similarly, in the scene, the base station does not know the actual physical channel, thus the user equipment is required to feed back the reconstructed channel to the base station, and the base station may demodulate the signal based on the reconstructed channel.

It should be noted that, preferably, the application scene shown in FIG. 6C and FIG. 6D is a time division duplex (TDD) scene, since the uplink/downlink channel has reciprocity in a time division duplex system. Practically, in some optional examples, a frequency division duplex (FDD) scene is also adaptable. Specifically, the FDD system may adjust the estimated uplink/downlink channel based on difference between uplink and downlink frequency bands, thereby determining the downlink/uplink channel to transmit the signal.

In addition, it should be noted that in the schematic scene shown in FIG. 6C and FIG. 6D, as the schematic scene shown in FIG. 6A and FIG. 6B, the transmitting end feeds back the reconstruction parameter to the receiving end. Since the receiving end does not known the original channel, the transmitting end is required to feed back the estimated original channel to the receiving end through precoding matrix indication (PMI) for example, so that the receiving end may calculate the reconstructed channel based on the original channel and the reconstruction parameter, so as to perform signal demodulation. The reconstruction parameter is long acting and the channel condition may change frequently. Therefore, in a case that the channel condition changes each time, only the original channel is required to be fed back to the receiving end through the PMI without feeding back the reconstruction parameter each time. In some cases, the manner can reduce signaling overhead to a certain degree.

It should be understood that, the signaling interaction processes described with reference to FIG. 6A to FIG. 6D are only schematic rather than restrictive, and those skilled in the art may change the above signaling interaction process according to the principle of the present disclosure. For example, as described above, in a case that the reconstruction parameter set is predetermined, in the examples shown in FIG. 6A and FIG. 6B, the channel reconstruction calculation and the reconstruction parameter configuration information feedback may be omitted, and the transmitting end and the receiving end may perform spatial modulation signal transmission and detection by directly using the predetermined reconstruction parameter matrix. In the example shown in FIG. 6C and FIG. 6D, the channel reconstruction calculation performed by the transmitting end may be omitted, and the actual physical channel is fed back to the receiving end, so that the receiving end may detect the signal based on the predetermined reconstruction parameter and the actual physical channel fed back.

It should be noted that, in the above embodiments, channel reconstruction is performed for each antenna. Practically, multiple antennas may be grouped based on spatial distribution of the antennas, and the channel reconstruction is performed based on the group. In this case, if there are a large number of antennas, a scale of the reconstruction parameter matrix can be reduced, thereby reducing the computing load. The calculation process of performing channel reconstruction based on the group is substantially similar to the process of performing channel reconstruction based on each antenna, and channel vectors of each group of antennas are processed as a whole. The details are not repeated here.

The data transceiving process of the multi-antenna transceiving system according to the principle of the spatial modulation technology of the present disclosure and applying the spatial modulation technology and the signaling interaction processes under different application scenes are described above as a whole. Specific implementation examples of the transmitting end device and the receiving end device to which the technology of the present disclosure is applied are described in detail respectively based on the above description.

Figure 8:
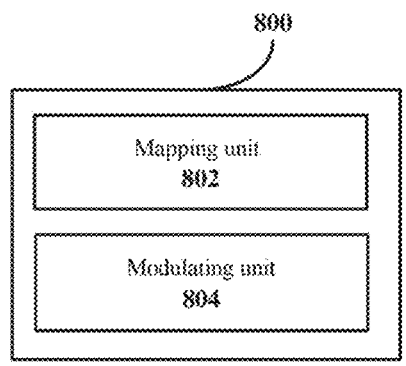
FIG. 8 is a block diagram of a function configuration example of an electronic apparatus for a multi-antenna communication device according to an embodiment of the present disclosure.

FIG. 8 is a block diagram of a function configuration example of an electronic apparatus for a multi-antenna communication device according to an embodiment of the present disclosure. The multi-antenna communication device here corresponds to the transmitting end device.

As shown in FIG. 8, an electronic apparatus 800 according to the embodiment may include a mapping unit 802 and a modulation unit 804.

The mapping unit 802 may be configured to map a first information bit to a first reconstructed channel among multiple reconstructed channels associated with multiple antennas of the multi-antenna communication device. The first information bit here may for example correspond to the information stream 2 shown in FIG. 4A. Preferably, a length of the first information bit is associated with the number of the multiple antennas.

Preferably, the electronic apparatus 800 may further include a memory which stores mapping relationship between the first information bit including different bits and respective reconstructed channels. Alternatively, the mapping relationship may be dynamically determined based on a real time channel condition by the electronic apparatus 800 or is fed back by the receiving end. In this case, the mapping unit 802 may map the first information bit including different bits to different reconstructed channels based on the mapping relationship.

The modulating unit 804 may be configured to provide a reconstruction parameter corresponding to the first reconstructed channel to reconstruct an actual channel from the multi-antenna communication device to a counterpart communication device, so as to carry the first information bit. In the example of the present disclosure, the reconstruction channel parameters corresponding to the information bit to be transmitted are provided to an amplifier and a phase shifter of the transmitting end, to configure at least one of an amplitude and a phase of the transmitting antenna. Further, the reconstruction parameter configuration information is provided to the receiving end device, that is, the whole reconstruction parameter matrix is provided to the receiving end device, so that the receiving end detects a signal. Multiple reconstructed channels are determined on the basis that multiple groups of reconstruction parameters configure multiple antennas of the multi-antenna communication device, so that the multiple reconstructed channels have low correlation with each other. Preferably, the multiple reconstructed channels may be orthogonal to each other. For the specific calculation process of the reconstructed channel, one may refer to the calculation of the reconstructed channel and the reconstruction parameter described with reference to FIG. 4A, and the specific content is not repeated here. The reconstruction parameter preferably includes parameters for configuring at least one of the amplitude and the phase of the antenna. Such configuration can be implemented by loading corresponding parameters to the phase shifter and the amplifier corresponding to each antenna, for example.

As described above with reference to FIG. 6A to FIG. 6D, the channel reconstruction calculation may be performed by the transmitting end or the receiving end, or the reconstruction parameter for channel reconstruction may be predetermined. In a case that the transmitting end performs the channel reconstruction the electronic apparatus 800 may further include a channel estimating unit and a channel reconstructing unit. The channel estimating unit performs channel estimation based on an uplink pilot signal or a downlink pilot signal transmitted by the receiving end, and the channel reconstruction unit performs channel reconstruction calculation based on the uplink pilot signal or downlink pilot signal, so that the reconstructed channels have low correlation with each other. Preferably, the channel reconstruction unit may perform orthogonalization calculation on a channel matrix corresponding to the actual channel, so that the reconstructed channels are orthogonal to each other, to obtain the corresponding reconstruction parameter. In addition, as described above, the electronic apparatus 800 at the transmitting end is further required to feed back the calculated reconstructed channel vector to the receiving end, so that the receiving end detects the received signal. In addition, in a case that the mapping mode between the reconstructed channel and the information bit is not predetermined, the electronic apparatus 800 is required to feed back the determined mapping mode to the receiving end. The mapping mode indicates mapping relationship between a first information bit including different bits and respective reconstructed channels.

In a case that the channel reconstruction is performed by the receiving end, multiple groups of reconstruction parameters corresponding to multiple reconstructed channels may be directly received from the receiving end. Alternatively, the reconstruction parameter may be determined by the transmitting end based on codeword indexes fed back by the receiving end and a predetermined codebook. In this case, if the indication information indicates that the mapping mode for the mapping relationship between the first information bit including different bits and respective reconstructed channels is not predetermined, the mapping unit 802 is required to map the first information bit to the first reconstructed channel based on the mapping mode fed back by the receiving end.

Practically, the multiple groups of reconstruction parameters may be preset based on the number of antennas of the multi-antenna communication device. With this manner, it cannot be ensured that the correlation between the reconstructed channels is minimized in all channel conditions, thus the reconstruction performance degrades to a certain degree. However, the calculation load can be reduced, particularly for a multi-user case and a case that the channel condition changes frequently.

Preferably, the modulating unit 804 may be further configured to modulate a second information bit into a first modulation symbol based on a predetermined modulation mode (such as BPSK and QPSK), so that the multi-antenna communication device transmits the first modulation symbol to the counterpart communication device by containing the first modulation symbol in the wireless signal, through a channel reconstructed by using the reconstruction parameter corresponding to the first reconstructed channel. The second information bit here corresponds to the information stream 1 shown in FIG. 4A.

Preferably, the electronic device 800 may further include a dividing unit configured to divide a data stream to be transmitted into a first information bit and a second information bit based on the number of antennas of the multi-antenna communication device. The first information bit is mapped to a number of the reconstructed channel, and the second information bit is modulated to an amplitude phase modulation symbol for transmission. Alternatively, as described above, the data stream to be transmitted may include only the first information bit. In this case, the second information bot may be a bit signal of all 1, all 0 or any bit signal rather than the modulated data. The case may adapt to for example the military application. The first information bit is used to carry a little important information, so that only the apparatus at the same location can correctly receive the transmitted information.

It should be understood that, the above electronic apparatus 800 may be implemented by a chip, or may be implemented by an apparatus including other external components. For example, the electronic apparatus 800 may operate as the multi-antenna communication device as a whole machine, and the electronic device 800 may further include multiple antennas and a phase shifter and an amplifier connected to each antenna. When the multi-antenna communication device transmits a signal, the multi-antenna communication device may provide the reconstruction parameter corresponding to the first reconstructed channel to the phase shifter and the amplifier, so as to configure the phases and the amplitudes of the multiple antennas, thereby reconstructing an actual channel.

In addition, it should be understood that, the above units are logic function modules divided based on the implemented functions, and are not intended to limit the specific implementations. In actual implementations, the above functional units may be implemented as independent physical entities or may be implemented by a single entity (for example, a processor (such as a CPU or a DSP), and an integrated circuit).

Figure 9:
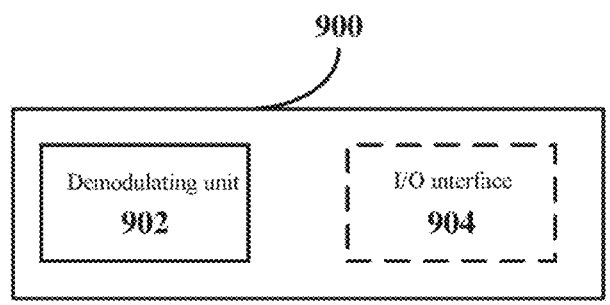
FIG. 9 shows a block diagram of a function configuration example of an electronic apparatus for a communication device according to an embodiment of the present disclosure.

Corresponding to the multi-antenna communication device at the transmitting end, a communication device at the receiving end is further disclosed according to the present disclosure. Hereinafter a functional configuration example of an electronic apparatus for the communication device is described with reference to FIG. 9. FIG. 9 is a block diagram of a function configuration example of an electronic apparatus for the communication device according to an embodiment of the present disclosure. The communication device corresponds to the receiving end device. The communication device may include one or more antennas.

As shown in FIG. 9, an electronic apparatus 900 according to the embodiment may include a demodulating unit 902 and an optional input/output (I/O) interface 904. The I/O interface 904 may be configured to acquire a signal from the transmitting end. The demodulating unit 902 may be configured to detect a number of an activated reconstructed channel based on the received signal and multiple reconstructed channels associated with multiple antennas of a counterpart multi-antenna communication device, so as to demodulate a first information bit from the counterpart multi-antenna communication device. The first information bit is mapped to the activated reconstructed channel. The multiple reconstructed channels are determined on the basis that multiple groups of reconstruction parameters configure the multiple antennas of the counterpart multi-antenna communication device, so that the multiple reconstructed channels have low correlation with each other.

The activated reconstructed channel here refers to a reconstructed channel to which the first information bit is mapped by the transmitting end. The activated reconstructed channel may be determined by using for example the maximum ratio combing detection algorithm, based on the correlation between respective reconstructed channels and the received signal. A reconstructed channel having highest correlation with the received signal vector is the activated reconstructed channel. Based on a number of the activated reconstructed channel and mapping relationship between the reconstructed channel and the information bit, the demodulating unit 902 can successfully demodulate the first information bit (that is, the information stream 2 shown in FIG. 4A). The mapping relationship may be predetermined and is stored in a memory of the electronic apparatus 900, may be determined based on a real time channel condition by the electronic apparatus 900, or may be fed back by the transmitting end. In addition, the demodulating unit 902 may be further configured to demodulate a second information bit from the multi-antenna communication device at the transmitting end (that is, the information stream 1 as shown in FIG. 4A), based on the detected activated reconstructed channel and the receiving end signal detection method described with reference to FIG. 5. In a case that the data stream to be transmitted is divided into the first information bit and the second information bit for transmission, the demodulating unit 902 may combine the first information bit and the second information bit obtained by demodulating to recover the original data stream.

As described above, the reconstructed channel calculation may be performed by the transmitting end or the receiving end. In a case that the reconstructed channel calculation is performed by the transmitting end, the electronic apparatus 900 may demodulate the signal by using the reconstructed channel fed back by the transmitting end. Alternatively, in a case that the reconstructed channel calculation is performed by the receiving end, the electronic apparatus 900 further includes a channel estimating unit and a channel reconstruction unit. The channel estimating unit and the channel reconstruction unit are respectively configured to estimate an actual channel from the multi-antenna communication device at the transmitting end to the communication device at the receiving end and reconstruct the actual channel based on an uplink pilot signal or a downlink pilot signal from the transmitting end, so that the reconstructed channels has low correlation with each other. For specific channel reconstruction algorithms, one may refer to description of FIG. 4A, which is not repeated here. After determining the reconstruction parameter matrix, as described above, the electronic apparatus 900 may directly feed back the reconstruction parameter matrix to the transmitting end, or feed back a codeword index corresponding to the calculated reconstruction parameter matrix to the transmitting end. In addition, in a case of dynamic mapping, the electronic apparatus 900 is required to provide a mapping mode for mapping relationship between the first information bit including different bits and respective reconstructed channels, to the multi-antenna communication device at the transmitting end. Alternatively, the reconstruction parameter may be preset based on the number of antennas at the transmitting end.

It should be understood that, similarly, the electronic apparatus 900 may be implemented by a chip, or may be implemented by an apparatus including other external components. For example, the electronic apparatus 900 may operate as a communication device as a whole machine, and the electronic apparatus may further include one or more antennas, and radio frequency elements such as an amplifier and a phase shifter. The one or more antennas may be configured to perform data transceiving with the counterpart multi-antenna communication device.

In addition, it should be understood that the above units are logic function modules divided based on the implemented functions, and are not intended to limit the specific implementations. In actual implementations, the above functional units may be implemented as independent physical entities or may be implemented by a single entity (for example, a processor (such as a CPU or a DSP), and an integrated circuit).

It should be understood that the electronic apparatus at the receiving end described here corresponds to the electronic apparatus at the transmitting end. For contents not described in detail here, one may refer to the above description, and the detailed content is not repeated here.

In addition, it should be understood that, the functional configurations of the electronic apparatus shown in FIG. 8 and FIG. 9 are only schematic, and those skilled in the art may change the above functional configuration according to the principle of the present disclosure, for example, combining, sub-combining, adding, deleting and/or changing the above functional units. In addition, in order to avoid obscuring the present disclosure, description of some well-known functional units and operations thereof are omitted in the described embodiments of FIG. 8 and FIG. 9, but the content can be easily obtained by those skilled in the art according to the principle of the present disclosure and well-known knowledge in the art. For content not described in detail in the embodiments of FIG. 8 and FIG. 9, one may refer to the detailed description for the spatial modulation technology above, and the content is not repeated here.

Corresponding to the above device embodiment, the following method embodiment is further provided according to the present disclosure.

Figure 10:
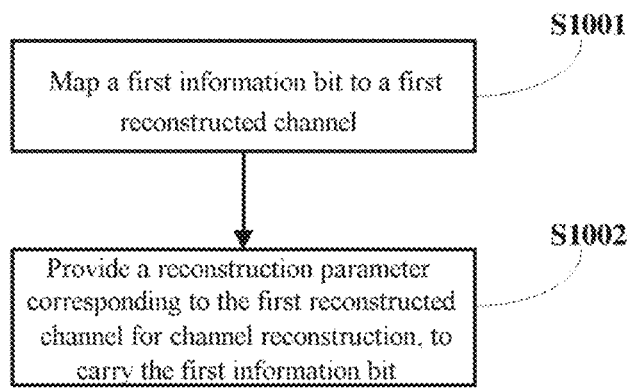
FIG. 10 shows a flowchart of a process example of a method for a multi-antenna communication device according to an embodiment of the present disclosure.

FIG. 10 is a flowchart of a process of a method for a multi-antenna communication device according to an embodiment of the present disclosure. The method is performed by the transmitting end.

As shown in FIG. 10, the method starts from step S1001. In step S1001, a first information bit is mapped to a first reconstructed channel among multiple reconstructed channels associated with multiple antennas of a multi-antenna communication device. Then, the method proceeds to step S1002. In step S1002, a reconstruction parameter corresponding to the first reconstructed channel is provided, so as to reconstruct an actual channel from the multi-antenna communication device to a counterpart communication device, so as to carry the first information bit. The multiple reconstructed channels are determined on the basis that multiple groups of reconstruction parameters configure multiple antennas of the multi-antenna communication device, so that the multiple reconstructed channels have low correlation with each other. Preferably, in step S1002, a second information bit may be modulated to a first modulation symbol, so that the multi-antenna communication device transmits the first modulation symbol to a counterpart communication device by containing the first modulation symbol in a wireless signal through the reconstructed channel.

Figure 11:
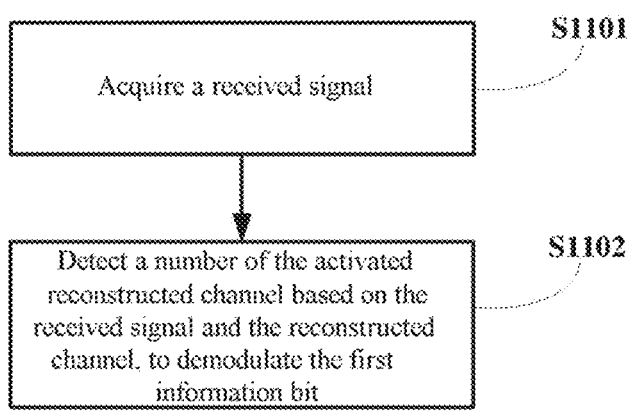
FIG. 11 shows a flowchart of a process example of a method for a communication device according to an embodiment of the present disclosure.

FIG. 11 is a flowchart of a process of a method for a communication device according to an embodiment of the present disclosure.

As shown in FIG. 11, the method starts from step S1101. In step S1101, a signal from a transmitting end is acquired. Then, the method proceeds to step S1102. In step S1102, a number of the activated reconstructed channel is detected, based on the received signal and multiple reconstructed channels associated with multiple antennas of a counterpart multi-antenna communication device, to demodulate the first information bit from the counterpart multi-antenna communication device. The multiple reconstructed channels are determined on the basis that multiple groups of reconstruction parameters configure multiple antennas of the counterpart multi-antenna communication device, so that the multiple reconstructed channels have low correlation with each other. Preferably, in step S1102, the received signal may be processed based on the detected activated reconstructed channel, and a modulation symbol in the signal is detected, to demodulate the second information bit from the counterpart multi-antenna communication device.

It should be noted that, the method embodiments described with reference to FIG. 10 and FIG. 11 respectively correspond to the embodiments of the transmitting end electronic apparatus and the receiving end electronic apparatus described with reference to FIG. 8 and FIG. 9. Therefore, for the content not described in detail here, one may refer to the description of the device embodiments, and the content is not repeated here.

In addition, it should be noted that the flowcharts shown in FIG. 10 and FIG. 11 are only schematic rather than restrictive. Those skilled in the art may make various variations according to the principle of the present disclosure, for example, adjusting an order for performing the method steps, and adding another step and so on.

According to the detailed description of the spatial modulation technology of the present disclosure, it should be understood that the spatial modulation technology of the present disclosure may be widely applied to uplink communication, downlink communication and Machine to Machine (M2M) communication and so on. In the technology of the present disclosure, the transmitting end device necessarily includes multiple antennas. In actual application, the user equipment may generally include one antenna and the base station includes multiple antennas, so that channel reconstruction is performed based on the actual channel condition in communicating with different user equipment, thereby achieving the spatial modulation according to the present disclosure. Therefore, the technology of the present disclosure may be more adaptable to downlink communication. In addition, for the M2M communication, the communication parties are communication devices at fixed position and may be provided with multiple antennas. Therefore, the spatial modulation technology of the present disclosure adapts to the scene obviously.

According to the technology of the present disclosure, channel reconstruction is performed to reduce the correlation between channels so that accuracy for data detection at the receiving end can be improved, thereby being beneficial to reduce a bit error rate and optimizing the performance of the whole communication system. Hereafter bit error rate simulation under different conditions is described with reference to FIG. 12A to FIG. 12C, to illustrate improvement of the performance of the communication system according to the present disclosure. In the following simulation experiments, taking an orthogonal spatial modulation in which the reconstructed channels are orthogonal as an example, performance comparison of the spatial modulation technology according to the present disclosure and the conventional spatial modulation technology under different conditions is described.

Figure 12A:
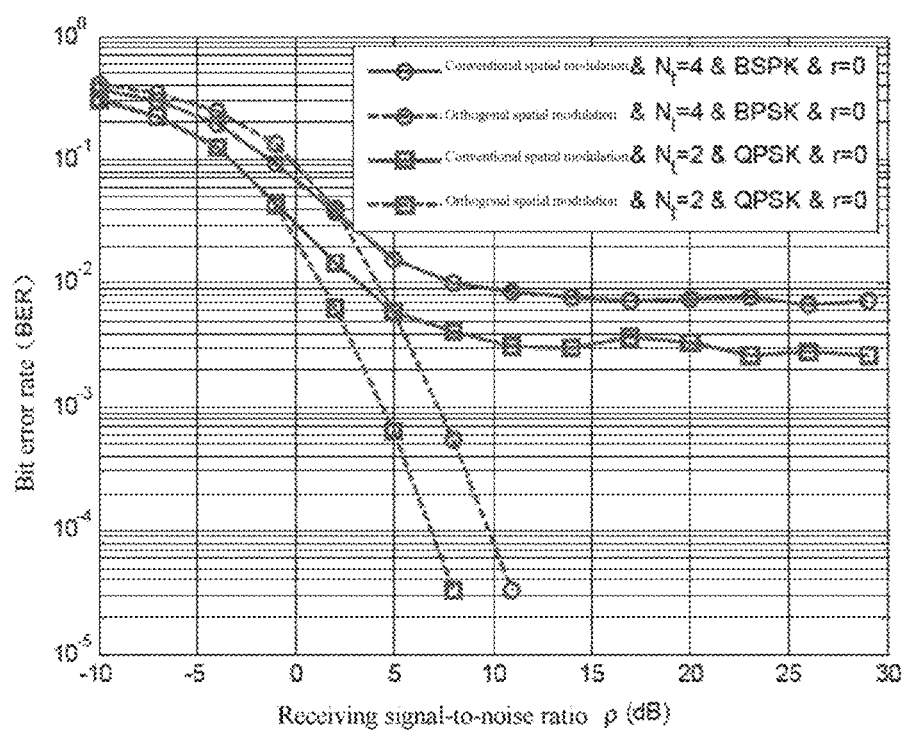
FIG. 12A to FIG. 12C respectively show schematic diagrams of bit error rate performance comparison between the conventional spatial modulation and the spatial modulation based on the technology of the present disclosure, for different transceiving signal to noise ratios, different numbers of receiving antennas and different channel correlation coefficients.
Figure 12B:
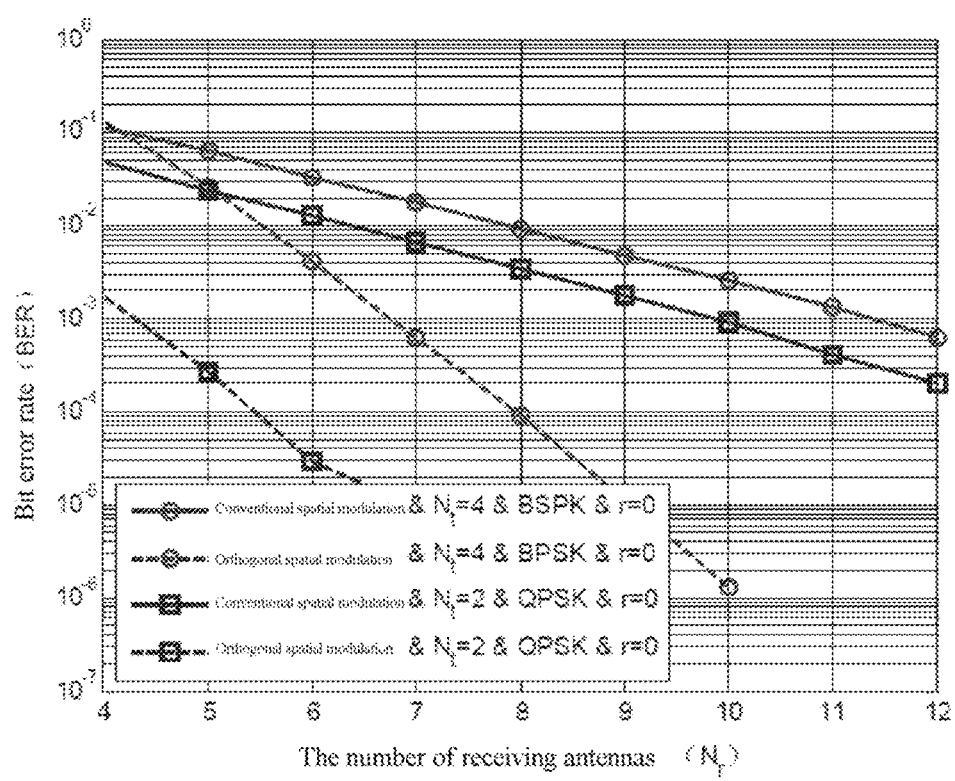
Figure 12C:
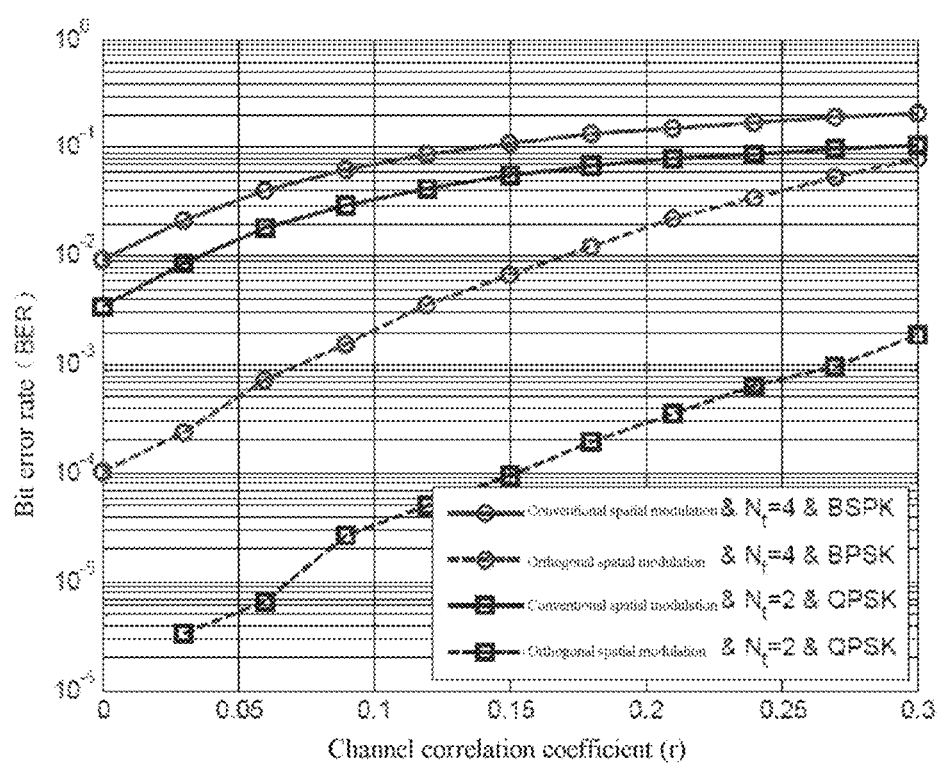

Here, a simulation experiment is conducted by using the monte carlo random method. Through $10^6$ times of random channel simulation, performance curves for bit error rate (BER) are drawn under different conditions (1. an average receiving signal-to-noise ratio (SNR) for each receiving antenna, as shown in FIG. 12A; 2. The number $N_r$ of the receiving end antennas, as shown in FIG. 12B; and 3. a channel correlation coefficient r, as shown in FIG. 12C). A transmission speed of two types 3 bits/modulation symbol is considered, that is, $\{N_r=4, BPSK\}$ and $\{N_r=2, QPSK\}$. Independent random channels ($h_{i,j} \sim CN(0,1)$) with the same distribution and related channels are considered. Specifically, the related channel matrix is generated according to the following equation:

$$H_{cor} = \Sigma_t^{\frac{1}{2}} H \Sigma_{r'}^{\frac{1}{2}}$$

In which, $\Sigma_t = [r_{i,j}]_{N_t \times N_t}$ and $\Sigma_r = [r_{i,j}]_{N_r \times N_r}$ respectively represent channel related matrices at the transmitting end and the receiving end. The correlation coefficient between the i-th transmitting antenna and the j-th receiving antenna is calculated according to $r_{i,j} = r^{|i-j|}, \forall i \neq j, r_{i,i} = 1$, in which, $0 \leq r \leq 1$ indicates the correlation coefficient. It can be seen that, in a case that the correlation coefficient r equal to 0, the correlation channel Hcor degrades to a random channel H. Detection is performed by using the maximum ratio combing detection algorithm at the receiving end.

FIG. 12A shows a performance curve showing change of a bit error rate with the receiving antenna signal-to-noise ratio, in a simulation condition that the receiving antenna number $N_r=8$, the channel correlation coefficient r=0, and the transmission speed B=3 bit/modulation symbol. In a case that the receiving signal-to-noise ratio is low, for example ρ=−5 dB, ρ represents the receiving signal-to-noise ratio, the performance of the spatial modulation according to the present disclosure is similar to that of the conventional spatial modulation, since the noise is a main source of interference. As the receiving signal-to-noise ratio increases, the bit error rate for the spatial modulation according to the present disclosure decreases quickly. That is because after the noise reduces, the channel reconstruction reduces interference between channels, thereby improving the performance quickly. However, the bit error rate for the conventional spatial modulation cannot be reduced continuously as the receiving signal-to-noise ratio increases, and a performance platform occurs quickly. That is because in a case that the signal-to-noise ratio is high enough, the interference mainly includes interference between the channels, which cannot be eliminated by using the conventional spatial modulation technology.

FIG. 12B shows a performance curve showing change of a bit error rate with the number of the receiving antennas, in a simulation condition that the channel correlation coefficient r=0, and the transmission speed B=3 bit/modulation symbol and the receiving signal-to-noise ratio ρ=10 dB. It can be seen that, the bit error rate for the conventional spatial modulation reduces such slower than the bit error rate for the spatial modulation according to the present disclosure. Therefore, in the same bit error rate condition, the number of antennas required for orthogonal spatial modulation is much less than the number of antennas required for the conventional spatial modulation. For example, the conventional spatial modulation can achieve the bit error rate of $10^{-4}$ by using 12 receiving antennas, and the orthogonal spatial modulation can achieve the same effect by using 5 antennas. In this case, the hardware cost can be reduced, thereby being beneficial to miniaturization of the device.

FIG. 12C shows a performance curve showing change of a bit error rate with the channel correlation coefficient, in a simulation condition that the transmission speed B=3 bit/modulation symbol, the receiving antenna number $N_r=8$ and the receiving signal-to-noise ratio ρ=10 dB. In the range of the channel correlation coefficient generally considered ($0 \leq r \leq 1$), the bit error rate for the orthogonal spatial modulation according to the present disclosure is lower than that for the conventional spatial modulation.

It can be seen from the performance comparison of FIG. 12A to FIG. 12C, with the spatial modulation technology according to the present disclosure, the bit error rate can be reduced, the hardware cost can be reduced, the data transmission speed is improved, and the detection algorithm is simplified and so on. Those skilled in the art may adjust the actual communication condition based on specific performance requirements, to obtain the corresponding performance gain.

It should be understood that, the machine executable instructions in the storage medium and the program product according to the embodiment of the present disclosure are executed to perform the method corresponding to the device embodiment. Therefore, for content not described in detail here, one may refer to the corresponding description above, and the content is not repeated here.

Accordingly, the storage medium for carrying the program product including the machine executable instruction is further included in the present disclosure. The storage medium includes but not limited to a software disk, an optical disk, a magnetic-optical disk, a storage card, and a storage stick and so on.

Figure 13:
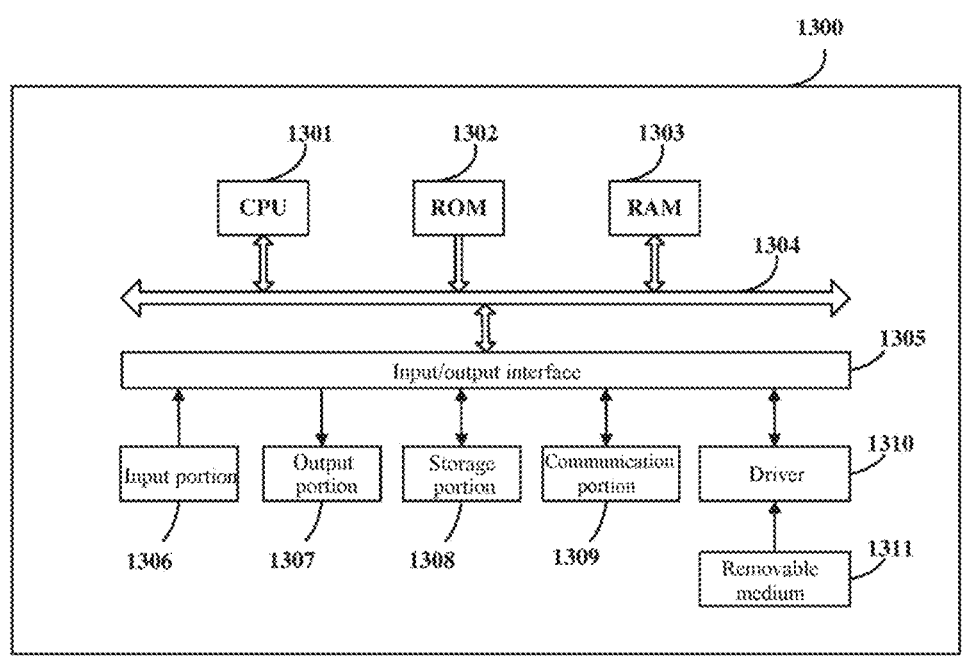
FIG. 13 shows a block diagram schematic structure of an available information processing apparatus, i.e., a personal computer, according to an embodiment of the present disclosure.

In addition, it should be noted that, the series of processing and device may be implemented by software and/or firmware. In a case of implementing by software and/or firmware, programs constituting the software are installed to a computer with a dedicated hardware structure, for example a general-purpose personal computer 1300 shown in FIG. 13, from a storage medium or a network. The computer can perform various functions when installed with various programs. FIG. 13 is a block diagram of a schematic structure of an available information processing apparatus, i.e., a personal computer, according to an embodiment of the present disclosure.

In FIG. 13, a central processing unit (CPU) 1301 performs various processing based on programs stored in a read only memory (ROM) 1302 or programs loaded to a random access memory (RAM) 1303 from a storage portion 1308. In the RAM 1303, data required when the CPU 1301 performs various processing is stored as needed.

The CPU 1301, the ROM 1302 and the RAM 1303 are connected to each other via a bus 1304. An input/output interface 1305 is also connected to the bus 1304.

The following components are connected to the input/output interface 1305: an input portion 1306 including a keyboard, a mouse and the like, an output portion 1307 including a display such as a Cathode Ray Tube (CRT) and a Liquid Crystal Display (LCD), a speaker and the storage portion 1308 including a hard disk and the like, and a communication portion 1309 including a network interface card such as a LAN card, a modem and the like. The communication portion 1309 performs communication processing via a network such as the Internet.

If necessary, a driver 1310 can also be connected to the input/output interface 1305. A removable medium 1311 such as a magnetic disk, an optical disk, a magneto-optical disk, a semiconductor memory and the like is mounted on the driver 1310 as necessary such that a computer program read out therefrom is installed in the storage portion 1308.

In a case that the series of processing above is implemented by software, a program constituting the software is installed from the network such as the Internet or the storage medium such as the removable medium 1311.

It is understood by those skilled in the art that the storage medium is not limited to the removable medium 1311 shown in FIG. 13 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage portion 1308 or the like. Herein, the program is stored in the storage medium, and the storage medium is distributed to the user together with the device containing the storage medium.

The technology of the present disclosure may be applied to various products. For example, the base station mentioned in the present disclosure may be implemented as any type of evolved node B (eNB) such as a macro eNB and a small eNB. The small eNB may be an eNB covering a cell smaller than a macro cell, such as a pico eNB, a micro eNB and a home (femto) eNB. Alternatively, the base station may be implemented as any other type of base station, such as the Node B and a base transceiver station (BTS). The base station may include: a body configured to control wireless communication (also referred to as a base station device); and one or more remote radio heads (RRHs) arranged at a position different from the position of the body. In addition, the various types of terminals described in the following may operate as a base station by performing the base station function temporarily or in a semi-persistence manner.

For example, the user equipment mentioned in the present disclosure may be implemented as a mobile terminal (such as a smartphone a tablet personal computer (PC), a notebook type PC, a portable game terminal, a portable/dongle mobile router and a digital camera) or a vehicle-mounted terminal (such as an automobile navigation device). The user equipment may be further implemented as a terminal performing machine to machine (M2M) communication (also referred to as machine type communication (MTC) terminal). In addition, the user equipment may be a wireless communication module (such as an integrated circuit module including a single wafer) installed in each of the above terminals.

Application examples of the present disclosure are described with reference to FIG. 14 to FIG. 17 hereinafter.

Application Example for a Base Station

First Application Example

Figure 14:
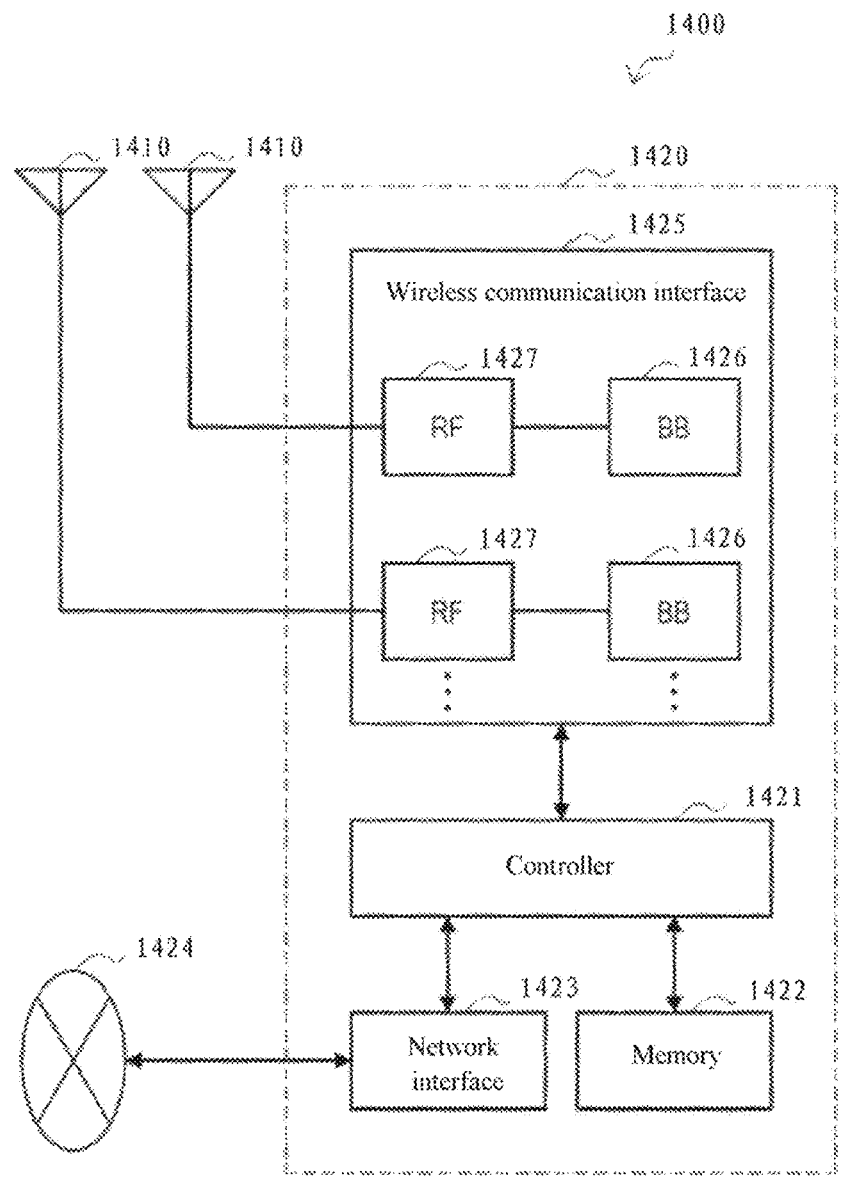
FIG. 14 is a block diagram showing a first example of a schematic configuration of an evolved node (eNB) to which the technology of the present disclosure may be applied.

FIG. 14 is a block diagram showing a first example of a schematic configuration of an eNB to which the technology of the present disclosure may be applied. An eNB 1400 includes one or more antennas 1410 and a base station device 1420. The base station device 1420 and each antenna 1410 may be connected to each other via an RF cable.

Each of the antennas 1410 includes a single or multiple antenna elements (such as multiple antenna elements included in a multiple-input multiple-output (MIMO) antenna) and is used for the base station device 1420 to transmit and receive a wireless signal. As shown in FIG. 14, the eNB 1400 may include multiple antennas 1410. For example, the multiple antennas 1410 may be compatible with multiple frequency bands used by the eNB 1400.

The base station device 1420 includes a controller 1421, a memory 1422, a network interface 1423 and a wireless communication interface 1425.

The controller 1421 may be a CPU or DSP for example and controls various types of functions of higher layers of the base station device 1420. For examples the controller 1421 generates a data packet according to data in a signal processed by the wireless communication interface 1425, and transfers the generated packet via the network interface 1423. The controller 1421 may bundle data from multiple baseband processors to generate a bundle packet and transfers the generated bundle packet. The controller 1421 may have logic functions to perform the following control such as wireless resource control, wireless bearer control, mobility management, admission control and schedule. The control may be implemented in conjunction with an eNB or a core network node nearby. The memory 1422 includes an RAM and an ROM and stores programs performed by the controller 1421 and various types of control data (such as a terminal list, transmission power data and schedule data).

The network interface 1423 is a communication interface connecting a base station device 1420 to a core network 1424. The controller 1421 may communicate with a core network node or another eNB via the network interface 1423. In this case, the eNB 1400 may be connected to the core network node or other eNB via a logic interface (such as an S1 interface and an X2 interface). The network interface 1423 may also be a wired communication interface or a wireless communication interface for a wireless backhaul line. If the network interface 1423 is a wireless communication interface, the network interface 1423 may use a higher frequency band for wireless communication as compared with a frequency band used by the wireless communication interface 1425.

The wireless communication interface 1425 supports any cellular communication scheme (such as Long Term Evolution and LTE-advanced), and provide wireless connection to a terminal in a cell of the eNB 1400 via an antenna 1410. The wireless communication interface 1425 may generally include a baseband (BB) processor 1426 and an RF circuit 1427. The BB processor 1426 may perform for example encoding/decoding modulating/demodulating and multiplexing and de-multiplexing and perform various types of signal processing of layers (such as L1, medium access control (MAC), radio link control (RLC) and packet data convergence protocol (PDCP). Instead of a controller 1421, the BB processor 1426 may have a part or all of the logic functions described above. The BB processor 1426 may be a memory storing communication control programs, or a module including a processor configured to perform programs and related circuits. Updating programs may change functions of the BB processor 1426. The module may be a card or a blade inserted to a slot of the base station device 1420. Alternatively the module may also be a chip installed on the card or the blade. Meanwhile, an RF circuit 1427 may include for example a mixer, a filter and an amplifier, and transmits and receives a wireless signal via the antenna

1410. Although FIG. 14 shows an example in which one RF circuit 1427 is connected one antenna 1410, the present disclosure is not limited to the case shown in FIG. 14 and one RF circuit 1427 may be connected to multiple antennas 1410.

As shown in FIG. 14, the wireless communication interface 1425 may include multiple BB processors 1426. For example, the multiple BB processors 1426 may be compatible with multiple frequency bands used by the eNB 1400. As shown in FIG. 14, the wireless communication interface 1425 may include multiple RF circuits 1427. For example, the multiple RF circuits 1427 may be compatible with multiple antenna elements. Although FIG. 14 shows an example in which the wireless communication interface 1425 includes multiple BB processors 1426 and multiple RF circuits 1427, the wireless communication interface 1425 may include a single BB processor 1426 or a single RF circuit 1427.

Second Application Example

Figure 15:
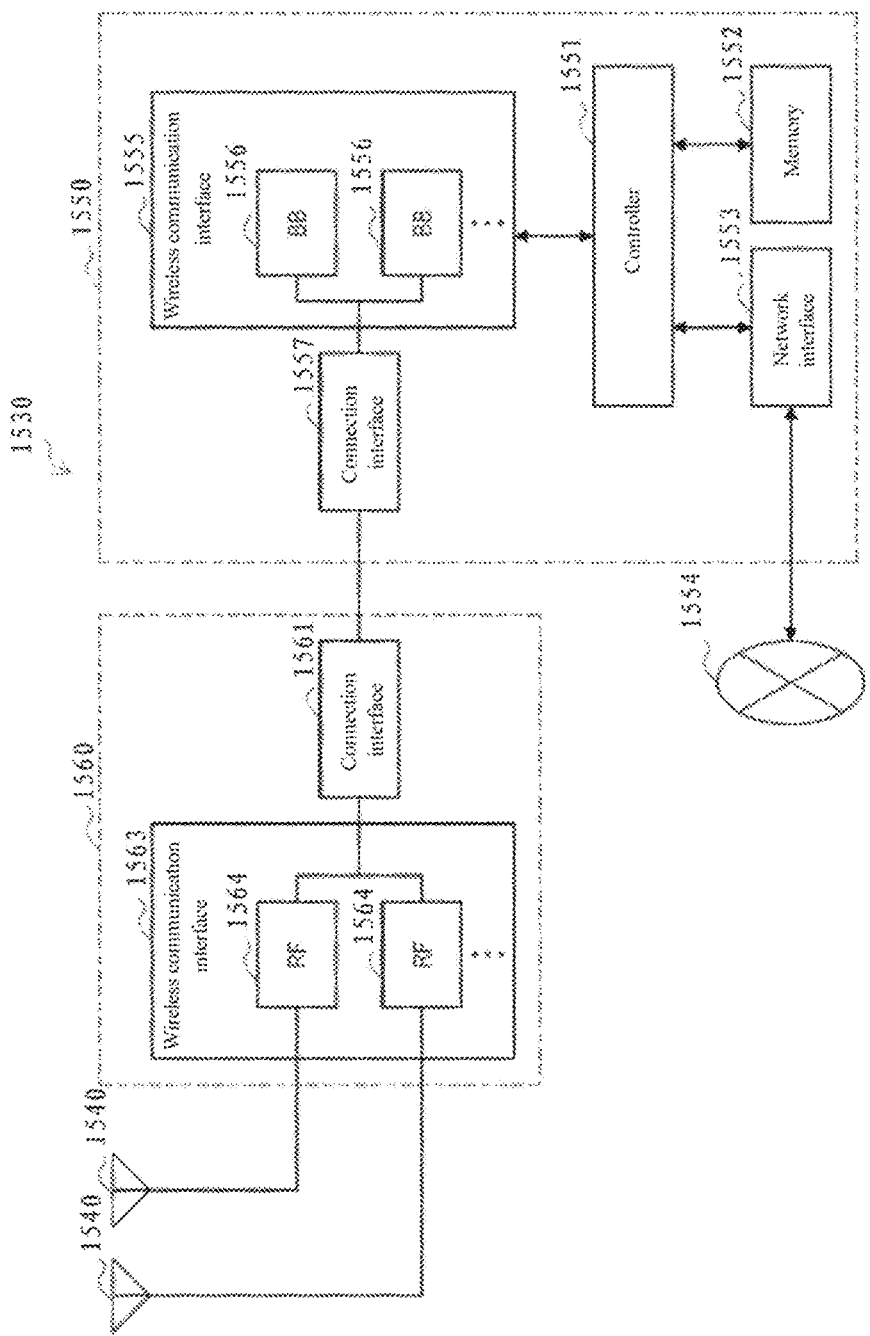
FIG. 15 is a block diagram of a second example of the schematic configuration of the eNB to which the technology of the present disclosure may be applied.

FIG. 15 is a block diagram showing a second example of the schematic configuration of the eNB to which the technology of the present disclosure may be applied. An eNB 1530 includes one or more antennas 1540, a base station device 1550 and an RRH 1560. The RRH 1560 and each antenna 1540 may be connected to each other via an RF cable. The base station device 1550 and the RRH 1560 may be connected to each other via a high speed line such as an optical fiber cable.

Each of the antennas 1540 includes a single or multiple antenna elements (such as multiple antenna elements included in the MIMO antenna) and is used for the RRH 1560 to transmit and receive a wireless signal. As shown in FIG. 15, the eNB 3330 may include multiple antennas 1540. For example, the multiple antennas 1540 may be compatible with multiple frequency bands used by the eNB 1530.

The base station device 1550 includes a controller 1551, a memory 1552, a network interface 1553, a wireless communication interface 1555 and a connection interface 1557. The controller 1551, the memory 1552 and the network interface 1553 are the same as the controller 1421, the memory 1422 and the network interface 1423 described with reference to FIG. 14.

A wireless communication interface 1555 supports any cellular communication scheme (such as LTE and LTE-advanced), and provide wireless communication with a terminal in a sector corresponding to the RRH 1560 via the RRH 1560 and the antenna 1540. The wireless communication interface 1555 may generally include a BB processor 1556 for example. In addition to that the BB processor 1556 is connected to an RF circuit 1564 of the RRH 1560 via the connection interface 1557, the BB processor 1556 is the same as the BB processor 1426 described with reference to FIG. 14. As shown in FIG. 15, the wireless communication interface 1555 may include multiple BB processors 1556. For example, the multiple BB processors 1556 may be compatible with multiple frequency bands used by the eNB 1530. Although FIG. 15 shows an example in winch the wireless communication interface 1555 includes multiple BB processors 1556, the wireless communication interface 1555 may include a single BB processor 1556.

The connection interface 1557 is an interface configured to connect the base station device 1550 (the wireless communication interface 1555) to the RRH 1560. The connection inter face 1557 may be a communication module for communication in the high speed line described above which connects the base station device 1550 (the wireless communication interface 1555) to the RRH 1560.

The RRH 1560 includes a connection interface and a wireless communication interface 1563.

The connection interface 1561 is an interface configured to connect the RRH 1560 (the wireless communication interface 1563) to the base station device 1550. The connection interface 1561 may be a communication module for performing communication via the high speed line described above.

The wireless communication interface 1563 transmits and receives a wireless signal via the antenna 1540. The wireless communication interface 1563 may generally include an RF circuit 1564 for example. The RF circuit 1564 may include for example a mixer, a filter and an amplifier, and transmits and receives a wireless signal via the antenna 1540. Although FIG. 15 shows an example in which one RF circuit 1564 is connected to one antenna 1540, the present disclosure is not limited to the case shown in FIG. 15 and one RF circuit 1564 may be connected to multiple antennas 1540.

As shown in FIG. 15, the wireless communication interface 1563 may include multiple RF circuits 1564. For example, multiple RF circuits 1564 may support multiple antenna elements. Although. FIG. 15 shows an example in which the wireless communication interface 1563 includes multiple RF circuits 1564, the wireless communication interface 1563 may include a single RF circuit 1564.

Application Example on a Terminal Device

First Application Example

Figure 16:
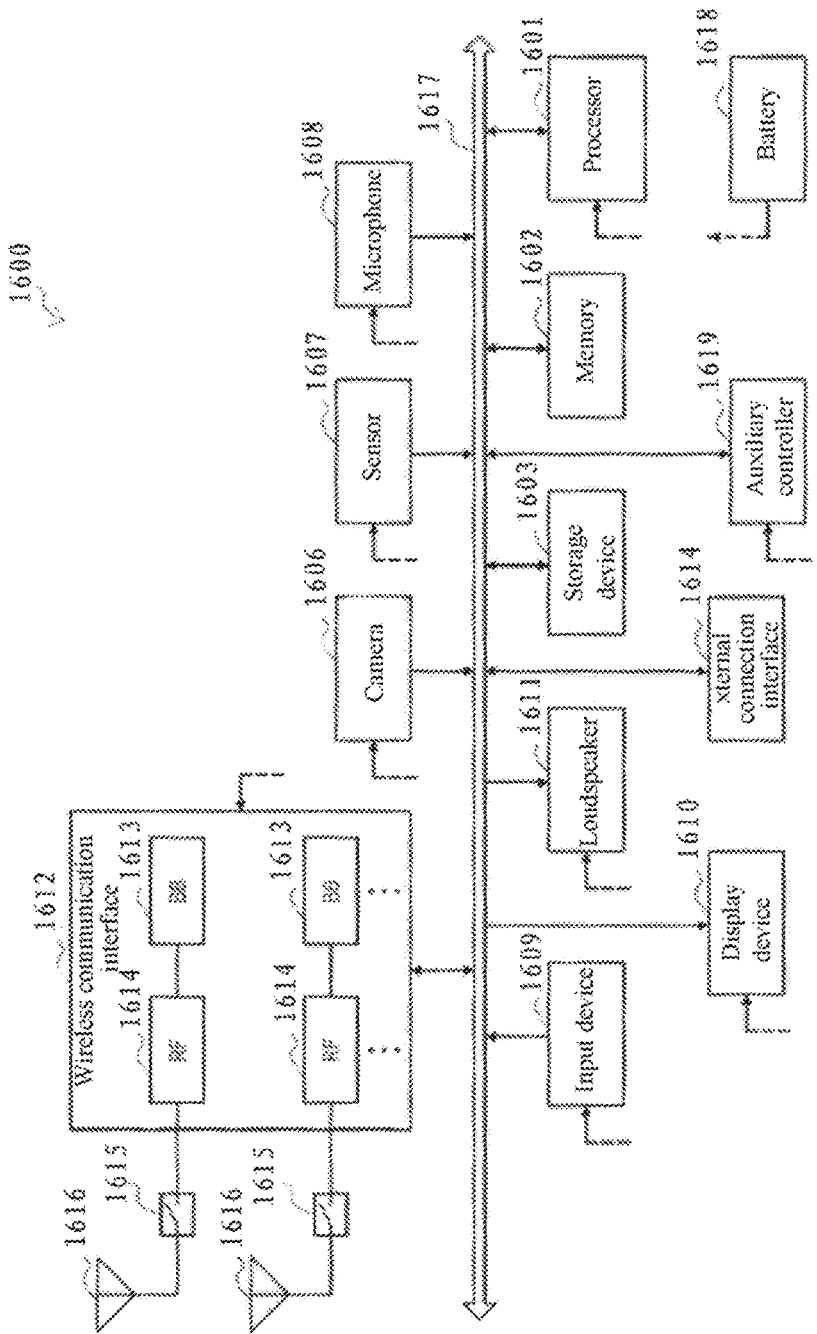
FIG. 16 is a block diagram of an example of a schematic configuration of a smartphone to which the technology of the present disclosure may be applied.

FIG. 16 is a block diagram showing an example of a schematic configuration of a smart phone 1600 to which the technology of the present disclosure may be applied. The smart phone 1600 includes a processor 1601, a memory 1602, a storm apparatus 1603, an external connection interface 1604, a camera 1606, a sensor 1607, a microphone 1608, an input apparatus 1609, a display apparatus 1610, a loudspeaker 1611, a wireless communication interface 1612, one or more antenna switches 1615, one or more antennas 1616, a bus 1617, a battery 1618 and an auxiliary controller 1619.

The processor 1601 may be for example a CPU or a system on chip (SoC), and control functions of an application layer and other layers of the smart phone 1600. The memory 1602 includes an RAM and an ROM, and stores programs executed by the processor 1601 and data. The storage apparatus 1603 may include a storage medium such as a semiconductor memory and a hard disk. The external connection interface 1604 is an interface configured to connect an external apparatus (such as a memory card and a universal serial bus (USB) device) to the smart phone 1600.

The camera 1606 includes an image sensor (such as a charge coupled device (CCD) and a complementary metal oxide semiconductor (CMOS)) and generates a captured image. The sensor 1607 may include a set of sensors, such as a measurement sensor, a gyroscope sensor, a geomagnetic sensor and an acceleration sensor. The microphone 1605 converts sound inputted into the smart phone 1600 into an audio signal. The input apparatus 1609 includes for example a touch sensor configured to detect touch on a screen of the display apparatus 1610, a keypad, a keyboard, a button or a switch, and receives an operation or information inputted from a user. The display apparatus 1610 includes a screen (such as a liquid crystal display (LCD) and an organic light emitting diode (LED) display), and displays an output image of the smart phone 1600. The loudspeaker 1611 converts the audio signal outputted from the smart phone 1600 into sound.

The wireless communication interface 1612 supports any cellular communication scheme (such as LTE and LTE-advanced), and performs wireless communication. The wireless communication interface 1612 may generally include for example a BB processor 1613 and an RF circuit 1614. The BB processor 1613 may perform encoding/decoding, modulating/demodulating and multiplexing/de-multiplexing for example, and perform various types of signal processing for wireless communication. Meanwhile, the RF circuit 1614 may include for example a mixer, a filter and an amplifier, and transmits and receives a wireless signal via an antenna 1616. The wireless communication interface 1612 may be a chip module on which a BB processor 1613 and the RF circuit 1614 are integrated. As shown in FIG. 16, the wireless communication interface 1612 may include multiple BB processors 1613 and multiple RF circuits 1614. Although FIG. 16 shows an example in which the wireless communication interface 1612 includes multiple BB processors 1613 and multiple RF circuits 1614, the wireless communication interface 1612 may include a single BB processor 1613 or a single RF circuit 1614.

In addition to the cellular communication scheme, the wireless communication interface 1612 may support other types of wireless communication schemes, such as a short distance wireless communication scheme, a near field communication scheme and a wireless local area network (LAN) scheme. In this case, the wireless communication interface 1612 may include a BB processor 1613 and an RF circuit 1614 for each type of wireless communication scheme.

Each of the wireless switches 1615 switches a connection destination of the antenna 1616 between multiple circuits (for example circuits for different wireless communication schemes) included in the wireless communication interface 1612.

Each of the antennas 1616 includes a single or multiple antenna elements (such as multiple antenna elements included in the MIMO antenna), and is used for the wireless communication interface 1612 to transmit and receive a wireless signal. As shown in FIG. 16, the smart phone 1600 may include multiple antennas 1616. Although FIG. 16 shows an example in which the smart phone 1600 includes multiple antennas 1616, the smart phone 1600 may include a single antenna 1616.

In addition, the smart phone 1600 may include an antenna 1616 for each type of wireless communication scheme. In this case, the antenna switch 1615 may be omitted from the configuration of the smart phone 1600.

The bus 1617 connects the processor 1601, the memory 1602, the storage apparatus 1603, the external connection interface 1604, the camera 1606, the sensor 1607, the microphone 1608, the input apparatus 1609, the display apparatus 1610, the loudspeaker 1611, the wireless communication interface 1612 and the auxiliary controller 1619 with each other. The battery 1618 supplies power for blocks in the smart phone 1600 shown in FIG. 16 via a feeder which is indicated partially as a dashed line in the figure. The auxiliary controller 1619 controls a minimum necessary function of the smart phone 1600 in a sleeping mode, for example.

Second Application Example

Figure 17:
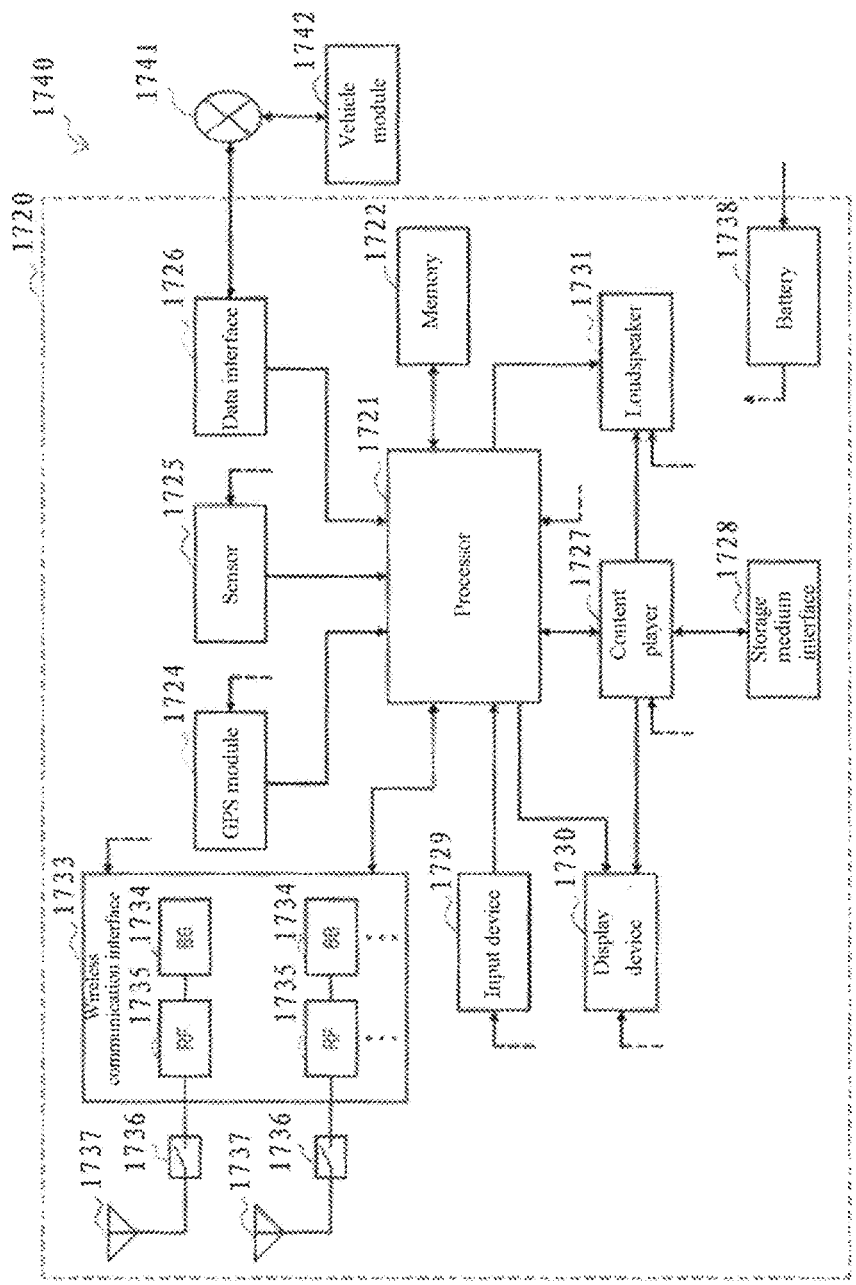
FIG. 17 is a block diagram of an example of a schematic configuration of an automobile navigation device to which the technology of the present disclosure may be applied.

FIG. 17 is a block diagram showing an example of a schematic configuration of an automobile navigation device 1720 to which the technology of the present disclosure may be applied. The automobile navigation device 1720 includes a processor 1721, a memory 1722, a global positioning system (GPS) module 1724, a sensor 1725, a data interface 1726, a content player 1727, a storage medium interface 1728, an input apparatus 1729, a display apparatus 1730, a loudspeaker 1731, a wireless communication interface 1733, one or more antenna switches 1736, one or more antennas 1737 and a battery 1738.

The processor 1721 may be a CPU or a SoC, and controls a navigation function and other functions of the automobile navigation device 1720. The memory 1722 includes an RAM and an ROM, and stores programs executed by the processor 1721 and data.

The GPS module 1724 measures a position of the automobile navigation device 1720 (such as a latitude, a longitude and a height) by using a GPS signal received from a GPS satellite. The sensor 1725 may include a set of sensors, such as a gyroscope sensor, a geomagnetic sensor and an air pressure sensor. The data interface 1726 is connected to a vehicle network 1741 for example through a terminal not shown, and acquires data generated by the vehicle (such as vehicle speed data).

The content player 1727 reproduces contents stored in a storage medium (such as a CD and a DVD), and the storage medium is inserted into the storage medium interface 1728. The input apparatus 1729 includes for example a touch sensor configured to detect touch on a screen of the display apparatus 1730, a button or a switch, and receives an operation or information inputted from a user. The display apparatus 1730 includes a screen of an LCD or OLED display for example, and displays an image with a navigation function or the reproduced content. The loudspeaker 1731 outputs a sound with a navigation function or the reproduced content.

The wireless communication interface 1733 supports any cellular communication scheme (such as LTE and LTE-advanced), and performs wireless communication. The wireless communication interface 1733 may generally include a BB processor 1734 and an RF circuit 1735 for example. The BB processor 1734 may perform encoding/decoding, modulating/demodulating and multiplexing/de-multiplexing, and perform various types of signal processing for wireless communication. Meanwhile, the RF circuit 1735 may include for example a mixer, a filter and an amplifier, and transmits and receives a wireless signal via the antenna 1737. The wireless communication interface 1733 may also be a chip module on which the BB processor 1734 and the RF circuit 1735 are integrated. As shown in FIG. 17, the wireless communication interface 1733 may include multiple BB processors 1734 and multiple RF circuits 1735. Although FIG. 17 shows an example in which the wireless communication interface 1733 includes multiple BB processors 1734 and multiple RF circuits 1735, the wireless communication interface 1733 may include a single BB processor 1734 or a single RF circuit 1735.

In addition to the cellular communication scheme, the wireless communication interface 1733 may support other types of wireless communication schemes, such as a short distance wireless communication scheme, a near field communication scheme and a wireless LAN scheme. In this case, for each type of wireless communication scheme, the wireless communication interface 1733 may include the BB processor 1734 and the RF circuit 1735.

Each of the antenna switches 1736 switches a connection destination of the antenna 1737 between multiple circuits (such as circuits for different wireless communication schemes) included in the wireless communication interface 1733.

Each of the antennas 1737 includes a single or multiple antenna elements (such as multiple antenna elements included in the MIMO antenna), and is used for the wireless communication interface 1733 to transmit and receive a wireless signal. As shown in FIG. 17, the automobile navigation device 1720 may include multiple antennas 1737. Although FIG. 17 shows an example in which the automobile navigation device 1720 includes multiple antennas 1737, the automobile navigation device 1720 may include a single antenna 1737.

In addition, the automobile navigation device 1720 may include the antenna 1737 for each type of wireless communication scheme. In this case, the antenna switch 1736 may be omitted from the configuration of the automobile navigation device 1720.

The battery 1738 supplies power for blocks in the automobile navigation device 1720 shown in FIG. 17 via a feeder which is indicated partially as a dashed line is the figure. The battery 1738 accumulates power provided by the vehicle.

The technology of the present disclosure may be implemented as a vehicle-mounted system (or a vehicle) 1740 including one or more of the automobile navigation device 1720, the vehicle network 1741 and a vehicle module 1742. The vehicle module 1742 generates vehicle data (such as a vehicle speed, an engine speed and fault information), and outputs the generated data to the vehicle network 1741.

The preferred embodiments of the present disclosure are described above with reference to the drawings, but the present disclosure is not limited to the above embodiments certainly. Those skilled in the art may make changes and variations within the scope of attached claims, and it should be understood that the changes and variations naturally fall within the technical scope of the present disclosure.

For example, in the above embodiments, multiple functions of one unit may be implemented by discrete devices. Alternatively in the above embodiments, multiple functions implemented by multiple units may be implemented by discrete devices respectively. In addition, one of the above functions may be achieved by multiple units. Needless to say such configuration is included in the technical scope of the present disclosure.

In the specification, steps described in the flowchart may not only include processing performed in the time order, but also include processing performed in parallel or separately and not necessarily performed in the time order. In addition, for steps performed in the time order, needless to say, the order may be changed appropriately.

Although the present disclosure and advantages thereof are described in detail, it should be understood that various changes, replacements and variations may be made without departing from the spirit and scope of the present disclosure defined by the attached claims. Furthermore, terms of "include", "comprise" or any other variants in the embodiments of the present disclosure are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method article or device.

The invention claimed is:

1. An electronic apparatus for a multi-antenna communication device, the electronic apparatus comprising:
a processing circuit configured to:
map a first information bit or bits to a first reconstructed channel among a plurality of reconstructed channels associated with a plurality of antennas of the multi-antenna communication device;
provide a reconstruction parameter corresponding to the first reconstructed channel to reconstruct an actual channel from the multi-antenna communication device to a counterpart communication device to carry the first information bit or bits; and
determine whether to switch from static mapping to dynamic mapping,
wherein, in response to a decision to switch from the static mapping to the dynamic mapping, the plurality of reconstructed channels are determined on the basis of a real time channel condition and on the basis that a plurality of sets of reconstruction parameters configure the plurality of antennas of the multi-antenna communication device so that the plurality of reconstructed channels have low correlation with each other, and a mapping relationship determined in accordance with the dynamic mapping is fed back along with the reconstruction parameter, the mapping relationship indicating a mapping between the first information bit or bits to the first reconstructed channel among the plurality of reconstructed channels to permit determination of the first reconstructed channel in response to an indication that the mapping relationship is not predetermined.

2. The electronic apparatus according to claim 1, wherein the reconstruction parameter comprises a parameter related to configuration for at least one of a phase and an amplitude of an antenna, and
wherein the processing circuit is further configured to:
modulate a second information bit or bits into a first modulation symbol so that the first modulation symbol is transmitted to the counterpart communication device via one of the plurality of reconstructed channels by being comprised in a radio signal from the multi-antenna communication device.

3. An electronic apparatus for a communication device, the electronic apparatus comprising:
a processing circuit configured to:
detect, according to a received signal and a plurality of reconstructed channels associated with a plurality of antennas of a counterpart multi-antenna communication device, whether to switch from static mapping to dynamic mapping and detect a number of an activated reconstructed channel, so as to demodulate a first information bit or bits from the counterpart multi-antenna communication device,
wherein the first information bit or bits are mapped to the activated reconstructed channel, and in response to a decision to switch from the static mapping to the dynamic mapping, the plurality of reconstructed channels being determined on the basis of a real time channel condition and on the basis that a plurality of sets of reconstruction parameters configure the plurality of antennas of the multi-antenna communication device so that the plurality of reconstructed channels have low correlation with each other, and a mapping relationship determined in accordance with the dynamic mapping is fed back along with a reconstruction parameter included in one of the plurality of sets of reconstruction parameters, the mapping relationship indicating a mapping between the first information bit or bits to the first reconstructed channel among the plurality of reconstructed channels to permit determination of the first reconstructed channel in response to an indication that the mapping relationship is not predetermined.

4. The electronic apparatus according to claim 3, wherein the plurality of sets of reconstruction parameters comprise parameters related to configuration for at least one of a phase and an amplitude of each of the plurality of antennas.

5. The electronic apparatus according to claim 3, wherein the processing circuit is further configured to:
process the received signal according to the detected activated reconstructed channel to detect a modulation symbol in the received signal, so as to demodulate a second information bit or bits from the counterpart multi-antenna communication device.

6. The electronic apparatus according to claim 5, wherein the processing circuit is further configured to: combine the first information bit or bits and the second information bit or bits to demodulate a data stream from the counterpart multi-antenna communication device.

7. The electronic apparatus according to claim 3, wherein a length of the first information bit or bits is related to the number of the plurality of antennas.

8. The electronic apparatus according to claim 3, wherein the electronic apparatus further comprises a memory configured to store the mapping relationship, and
the processing circuit is further configured to demodulate, based on the mapping relationship, the first information bit or bits according to the detected number of the activated reconstructed channel.

9. The electronic apparatus according to claim 3, wherein the plurality of reconstructed channels are orthogonal to each other.

10. The electronic apparatus according to claim 9, wherein the plurality of sets of reconstruction parameters are obtained, by the processing circuit, based on orthogonalization computation performed on a channel matrix corresponding to actual channels from the counterpart multi-antenna communication device to the communication device.

11. The electronic apparatus according to claim 10, wherein the processing circuit is further configured to feed the plurality of sets of reconstruction parameters back to the counterpart multi-antenna communication device.

12. The electronic apparatus according to claim 10, wherein the processing circuit is further configured to determine, according to a predetermined codebook and the plurality of sets of reconstruction parameters, codewords corresponding to the plurality of sets of reconstruction parameters in the predetermined codebook, and feed indexes of the codewords back to the counterpart multi-antenna communication device.

13. The electronic apparatus according to claim 9, wherein the plurality of reconstructed channels are fed back from the counterpart multi-antenna communication device.

14. The electronic apparatus according to claim 13, wherein the processing circuit is further configured to demodulate, according to a mapping manner provided by the counterpart multi-antenna communication device, the first information bit or bits, the mapping manner indicating the mapping relationship.

15. The electronic apparatus according to claim 3, wherein the processing circuit is further configured to detect a reconstructed channel having greatest correlation with the received signal among the plurality of reconstructed channels as the activated reconstructed channel.

16. The electronic apparatus according to claim 3, wherein the electronic apparatus operates as the communication device and further comprises:
an antenna configured to perform data transmission and reception with the counterpart multi-antenna communication device.

17. A method for a multi-antenna communication device, the method comprising:
mapping a first information bit or bits to a first reconstructed channel among a plurality of reconstructed channels associated with a plurality of antennas of the multi-antenna communication device;
providing a reconstruction parameter corresponding to the first reconstructed channel to reconstruct an actual channel from the multi-antenna communication device to a counterpart communication device to carry the first information bit or bits; and
determining whether to switch from static mapping to dynamic mapping,
wherein, in response to a decision to switch from the static mapping to the dynamic mapping, the plurality of reconstructed channels are determined on the basis of a real time channel condition and on the basis that a plurality of sets of reconstruction parameters configure the plurality of antennas of the multi-antenna communication device so that the plurality of reconstructed channels have low correlation with each other, and a mapping relationship determined in accordance with the dynamic mapping is fed back along with the reconstruction parameter, the mapping relationship indicating a mapping between the first information bit or bits to the first reconstructed channel among the plurality of reconstructed channels to permit determination of the first reconstructed channel in response to an indication that the mapping relationship is not predetermined.

18. A method for a communication device, the method comprising:
detecting, according to a received signal and a plurality of reconstructed channels associated with a plurality of antennas of a counterpart multi-antenna communication device, whether to switch from static mapping to dynamic mapping and detecting a number of an activated reconstructed channel, so as to demodulate a first information bit or bits from the counterpart multi-antenna communication device,
wherein the first information bit or bits are mapped to the activated reconstructed channel, and in response to a decision to switch from the static mapping to the dynamic mapping, the plurality of reconstructed channels being determined on the basis of a real time channel condition and on the basis that a plurality of sets of reconstruction parameters configure the plurality of antennas of the multi-antenna communication device so that the plurality of reconstructed channels have low correlation with each other, and a mapping relationship determined in accordance with the dynamic mapping is fed back along with a reconstruction parameter included in one of the plurality of sets of reconstruction parameters, the mapping relationship indicating a mapping between the first information bit or bits to the first reconstructed channel among the plurality of reconstructed channels to permit determination of the first reconstructed channel in response to an indication that the mapping relationship is not predetermined.

\* \* \* \* \*